(12) United States Patent
Wee et al.

(10) Patent No.: US 11,327,212 B2
(45) Date of Patent: May 10, 2022

(54) POLARIZING PLATE AND LIQUID CRYSTAL DISPLAY COMPRISING THE SAME

(71) Applicant: SAMSUNG SDI CO., LTD., Yongin-si (KR)

(72) Inventors: Dong Ho Wee, Suwon-si (KR); Jeong Ho Lee, Suwon-si (KR); Young Oh, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/556,107

(22) Filed: Aug. 29, 2019

(65) Prior Publication Data

US 2020/0073036 A1    Mar. 5, 2020

(30) Foreign Application Priority Data

Aug. 31, 2018 (KR) .................. 10-2018-0104006
Aug. 7, 2019 (KR) .................. 10-2019-0096380

(51) Int. Cl.
*G02B 5/30* (2006.01)
*G02F 1/1335* (2006.01)

(52) U.S. Cl.
CPC ..... *G02B 5/3025* (2013.01); *G02F 1/133528* (2013.01)

(58) Field of Classification Search
None
See application file for complete search history.

(56) References Cited

U.S. PATENT DOCUMENTS

| 2018/0045876 A1* | 2/2018 | Lee | ............... G02B 6/0053 |
| 2019/0212607 A1* | 7/2019 | Tien | ............... G02B 5/021 |

FOREIGN PATENT DOCUMENTS

| CN | 107533180 A | 1/2018 |
| CN | 108287429 A | 7/2018 |
| CN | 108427155 A | 8/2018 |
| JP | H 10-104433 A | 4/1998 |
| JP | 2006-251659 A | 9/2006 |
| JP | 2008-3245 A | 1/2008 |

(Continued)

OTHER PUBLICATIONS

Espacenet English machine translation of JP2008003245A (Year: 2008).*

(Continued)

*Primary Examiner* — Edward J Glick
*Assistant Examiner* — David Y Chung
(74) *Attorney, Agent, or Firm* — Lewis Roca Rothgerber Christie LLP

(57) ABSTRACT

A polarizing plate and a liquid crystal display including the same are provided. A polarizing plate includes: a polarizer; and a pattern layer on a light exit surface of the polarizer, the pattern layer including a first resin layer and a second resin layer sequentially arranged on the polarizer, a pattern portion being located at an interface between the first resin layer and the second resin layer and being composed of at least two pattern groups repeatedly arranged therein, each of the pattern groups including at least two engraved optical patterns; and at least two of the engraved optical patterns in each of the pattern groups having different aspect ratios and different base angles.

19 Claims, 13 Drawing Sheets

(56) References Cited

FOREIGN PATENT DOCUMENTS

TW           201643483 A      12/2016
WO     WO-2016175580 A1  *  11/2016   ........... G02B 6/0053

OTHER PUBLICATIONS

Taiwan Office Action dated Apr. 9, 2020 in corresponding Taiwan Application No. 108131246 (9 pgs.).
Chinese Office Action in corresponding Chinese Patent Application No. 201910812560.X, Chinese Office Action dated Apr. 12, 2021 (7 pgs.).

* cited by examiner

POLARIZING PLATE AND LIQUID CRYSTAL DISPLAY COMPRISING THE SAME

CROSS-REFERENCE TO RELATED APPLICATION

This application claims priority to and the benefit of Korean Patent Application No. 10-2018-0104006, filed on Aug. 31, 2018, and Korean Patent Application No. 10-2019-0096380, filed on Aug. 7, 2019, in the Korean Intellectual Property Office, the entire disclosure of both of which are incorporated herein by reference.

FIELD

Aspects of embodiments of the present invention relate to a polarizing plate and a liquid crystal display including the same.

DESCRIPTION OF THE RELATED ART

A liquid crystal display is operated to allow light emitted from a backlight unit to sequentially pass through a light source-side polarizing plate, a liquid crystal panel, and a viewer-side polarizing plate. Light emitted from a light source spreads while passing through the backlight unit and then enters the light source-side polarizing plate. As a result, the liquid crystal display suffers from gradual deterioration in contrast ratio and color deviation from a front side to a lateral side while light passes through the light source-side polarizing plate, the liquid crystal panel, and the viewer-side polarizing plate. To address such problems, a retardation film may be applied to the light source-side polarizing plate or the viewer-side polarizing plate. However, it is difficult for the retardation film to achieve complete compensation of light from the front side to the lateral side and to prevent light leakage, particularly in a diagonal direction.

In order to address the aforementioned problems, use of a light-collecting backlight unit is suggested. The light-collecting backlight unit employs an inverted prism light-collecting sheet instead of a typical normal prism diffusion sheet. The normal prism diffusion sheet is a sheet having a prism formed on a light exit surface of a sheet member, and the inverted prism light-collecting sheet is a sheet having a prism on a light incident surface of a sheet member. This technique is a light collecting-scattering system that minimizes or reduces difference in contrast ratio depending upon viewing angle by allowing light emitted from the light-collecting backlight unit through light collection to pass through a liquid crystal panel and secures viewing angle by scattering light at the outermost surface of the viewer-side polarizing plate. To this end, there is a need for development of an optical device in consideration of the light-collecting backlight unit. Although a scattering particle-containing film may be used as the optical device to be disposed on the outermost surface of the viewer-side polarizing plate, there is a limitation in terms of enlargement of viewing angle of the scattering particle-containing film and/or improvement in external appearance thereof.

The background technique of the present invention is disclosed in Japanese Unexamined Patent Publication No. 2006-251659.

SUMMARY

According to an aspect of embodiments of the present invention, a polarizing plate is capable of improving brightness, viewing angle, and contrast ratio at a front side and a lateral side in application to a liquid crystal display including a light-collecting backlight unit.

According to another aspect of embodiments of the present invention, a polarizing plate is capable of improving front contrast ratio, lateral contrast ratio, and external appearance in application to a liquid crystal display including a light-collecting backlight unit.

According to another aspect of embodiments of the present invention, a polarizing plate is capable of reducing deviation in ratio of brightness at a lateral side to brightness at a front side depending upon an angle of the lateral side in application to a liquid crystal display including a light-collecting backlight unit.

According to another aspect of embodiments of the present invention, a liquid crystal display includes a light-collecting backlight unit, has improved brightness, viewing angle, and contrast ratio at a front side and a lateral side, and has reduced deviation in ratio of brightness at a lateral side to brightness at a front side depending upon an angle of the lateral side.

In accordance with one or more embodiments of the present invention, a polarizing plate includes: a polarizer; and a pattern layer on a light exit surface of the polarizer, wherein the pattern layer includes a first resin layer and a second resin layer sequentially arranged on the polarizer, and a pattern portion is located at an interface between the first resin layer and the second resin layer and is composed of at least two pattern groups repeatedly arranged therein, each of the pattern groups including at least two engraved optical patterns, and at least two of the engraved optical patterns in each of the pattern groups have different aspect ratios and different base angles.

The engraved optical patterns may have an aspect ratio of about 0.3 to about 3.0.

The engraved optical patterns in the pattern groups may have a difference of about 0.5 or more between a maximum aspect ratio and a minimum aspect ratio.

The engraved optical patterns may have a base angle of about 60° to about 90°.

The engraved optical patterns in the pattern groups may have a difference of about 5° or more between a maximum base angle and a minimum base angle.

The engraved optical patterns may have a flat surface at a top portion thereof and an N-sided polygonal cross-sectional shape, N being an integer from 4 to 10.

The engraved optical patterns in the pattern groups may be consecutively arranged without a flat section therebetween.

A flat section may be absent or may be further formed between two immediately adjacent pattern groups.

The engraved optical patterns may extend in a stripe shape in a longitudinal direction thereof.

An angle defined between a longitudinal direction of the engraved optical pattern and an absorption axis of the polarizer may be about −20° to about 20°, from about 70° to about 110°, or from about −70° to about −110°, wherein the absorption axis of the polarizer is defined as 0°.

The first resin layer may have a higher refractive index than the second resin layer.

An absolute value of a difference in refractive index between the first resin layer and the second resin layer may be about 0.05 or more.

A number of the engraved optical patterns in each pattern group may be from 2 to 10.

Each of the pattern groups may be composed of a total of two optical patterns comprising a first pattern and a second pattern as the engraved optical patterns, and the first pattern and the second pattern may have different base angles and different aspect ratios.

Each of the pattern groups may be composed of a total of three optical patterns comprising a first pattern, a second pattern, and a third pattern consecutively arranged without a flat section therebetween, as the engraved optical patterns, and at least two of the first pattern, the second pattern, and the third pattern may have different base angles and different aspect ratios.

The first resin layer may be a filling portion filling at least part of the engraved optical patterns, or a layer including the filling portion.

The polarizing plate may further include a protective film stacked on at least one of a light exit surface and a light incident surface of the pattern layer.

The polarizing plate may further include at least one surface treatment layer selected from among a hard coating layer, a scattering layer, a low reflectivity layer, an ultra-low reflectivity layer, a primer layer, an anti-fingerprint layer, an antireflection layer, and an antiglare layer on at least one surface of the protective film.

In accordance with one or more embodiments of the present invention, a liquid crystal display includes a polarizing plate according to the present invention.

The liquid crystal display may include a backlight unit, a light source-side polarizing plate, a liquid crystal panel, and the polarizing plate sequentially stacked in the stated order, and the backlight unit may include a light-collecting backlight unit including an inverted prism sheet.

In a white mode of the light-collecting backlight unit, a ratio ($W_{30°}=L_{30°}/L_{0°}$) of brightness ($L_{30°}$) at a lateral side (30° or −30°) to brightness ($L_{0°}$) at a front side (0°) may be from about 0.1 to about 0.5, and a ratio ($W_{60°}=L_{60°}/L_{0°}$) of brightness ($L_{60°}$) at a lateral side (60° or −60°) to brightness ($L_{0°}$) at the front side (0°) may be from about 0 to about 0.1.

DETAILED DESCRIPTION

Figure 1:
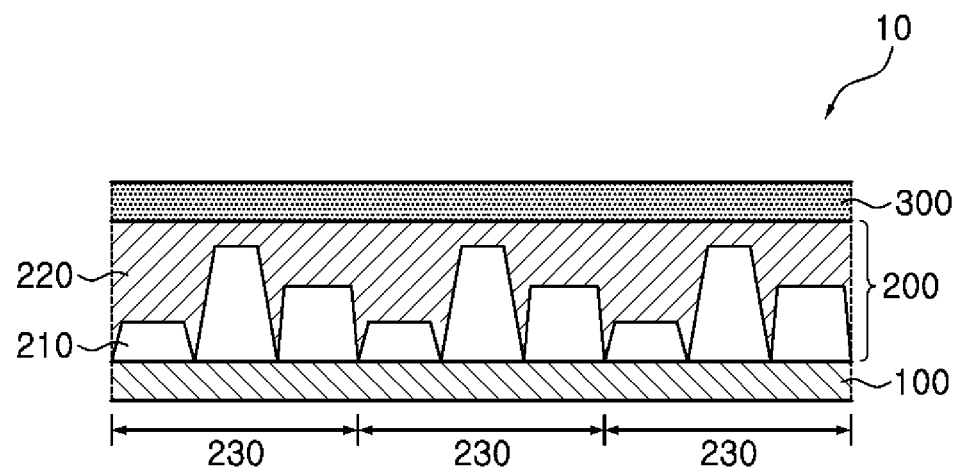
FIG. 1 is a cross-sectional view of a polarizing plate according to an embodiment of the present invention.

Some example embodiments of the present invention will be described in further detail with reference to the accompanying drawings to provide a thorough understanding of the invention to those skilled in the art. It is to be understood that the present invention may be embodied in different ways and is not limited to the following embodiments. In the drawings, portions irrelevant to the description may be omitted for clarity. Like components will be denoted by like reference numerals throughout the specification.

Herein, spatially relative terms, such as "upper" and "lower," are defined with reference to the accompanying drawings. Thus, it is to be understood that the term "upper surface" can be used interchangeably with the term "lower surface," for example, and when an element, such as a layer or a film, is referred to as being placed "on" another element, it may be directly placed on the other element, or one or more intervening elements may be present. On the other hand, when an element is referred to as being placed "directly on" another element, there are no intervening element(s) therebetween.

Herein, the terms "horizontal direction" and "vertical direction" mean a longitudinal direction and a transverse direction of a rectangular screen of a liquid crystal display, respectively. Herein, "lateral side" refers to −30°, −45°, −60°, 30°, 45°, or 60° in a system in which a front side is indicated by 0°, a left end point is indicated by −90°, and a right end point is indicated by 90° with reference to the horizontal direction.

Herein, "top portion" refers to the highest point of an engraved optical pattern.

Herein, "aspect ratio" refers to a ratio of the maximum height of an engraved optical pattern to the maximum width thereof (maximum height/maximum width).

Herein, "base angle" means an angle defined between the maximum width of an optical pattern and a slanted surface directly connected to the maximum width thereof. For example, referring to FIG. 2, the base angle means an angle α1 defined between the maximum width W1 of an optical pattern 230A and a slanted surface 231 directly connected to the maximum width W1 of the optical pattern 230A. For example, referring to FIG. 3, the base angle means an angle α1 defined between the maximum width W1 of an optical pattern 240A and a slanted surface 241 directly connected to the maximum width W1 of the optical pattern 240A.

Herein, "in-plane retardation (Re)" is a value measured at a wavelength of 550 nm and is represented by Equation A:

$$Re=(nx-ny)\times d,$$

where nx and ny are the indices of refraction in the slow and fast axes of a protective layer at a wavelength of 550 nm, respectively, and d is the thickness (unit: nm) of the protective layer.

Herein, the term "(meth)acryl" refers to acryl and/or methacryl.

Unless specifically stated otherwise, a lateral side (30°) may mean at least one of a lateral side of 30° and a lateral side of −30°, a lateral side (45°) may mean at least one of a lateral side of 45° and a lateral side of −45°, and a lateral side (60°) may mean at least one of a lateral side of 60° and a lateral side of −60°.

Figure 8:
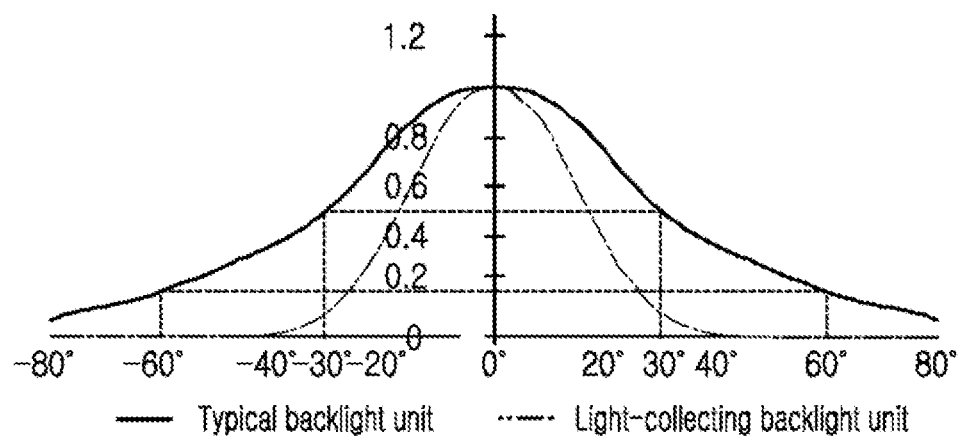
FIG. 8 shows brightness profiles depicting a ratio of brightness at a lateral side to brightness ($L_{0°}$) at a front side (0°) with respect to light emitted from a light-collecting backlight unit and a typical backlight unit in a white mode.

FIG. 8 shows a brightness profile (dash-dotted line in FIG. 8) depicting a ratio of brightness at a lateral side to brightness ($L_{0°}$) at a front side (0°) with respect to light emitted from a light-collecting backlight unit in a white mode and a brightness profile (solid line in FIG. 8) depicting a ratio of brightness at a lateral side to brightness ($L_{0°}$) at a front side (0°) with respect to light emitted from a typical backlight unit in a white mode.

According to embodiments of the present invention, for the light-collecting backlight unit, in a white mode, a ratio ($W_{30°}=L_{30°}/L_{0°}$) of brightness ($L_{30°}$) at a lateral side (30° or −30°) to brightness ($L_{0°}$) at a front side (0°) may be about 0.1 to about 0.5, and, in an embodiment, 0.1 to 0.15, and, in an embodiment, 0.11, and a ratio ($W_{60°}=L_{60°}/L_{0°}$) of brightness ($L_{60°}$) at a lateral side (60° or −60°) to brightness ($L_{0°}$) at a front side (0°) may be about 0 to about 0.1, and, in an embodiment, about 0 to about 0.05, and, in an embodiment, about 0.

For the typical backlight unit, in a white mode, a ratio ($W_{30°}=L_{30°}/L_{0°}$) of brightness ($L_{30°}$) at a lateral side (30° or −30°) to brightness ($L_{0°}$) at a front side (0°) may be 0.5 to 0.6, for example, greater than 0.5 to about 0.6 or less, and a ratio ($W_{60°}=L_{60°}/L_{0°}$) of brightness ($L_{60°}$) at a lateral side (60° or −60°) to brightness ($L_{0°}$) at a front side (0°) may be about 0.1 to about 0.2.

As such, the light-collecting backlight unit according to embodiments of the present invention exhibits a completely different brightness profile than the typical backlight unit, as shown in FIG. 8. The "typical backlight unit" means a backlight unit not including an inverted prism light-collecting sheet, specifically, a backlight unit including a normal prism diffusion sheet.

According to embodiments of the present invention, as a viewer-side polarizing plate configured to emit light received from a light-collecting backlight unit including an inverted prism, the viewer-side polarizing plate includes a polarizer and a pattern layer formed on a light exit surface of the polarizer, wherein the pattern layer includes a first resin layer, a second resin layer, and a pattern portion having pattern groups repeatedly arranged at an interface between the first resin layer and the second resin layer, thereby improving brightness, viewing angle, and contrast ratio at a front side and a lateral side while reducing deviation in ratio of brightness at the lateral side to brightness at the front side depending upon an angle of the lateral side in application to a liquid crystal display including a light-collecting backlight unit.

The pattern group is composed of at least two engraved optical patterns, in which at least two of the engraved optical patterns have different aspect ratios and different base angles.

Figure 2:
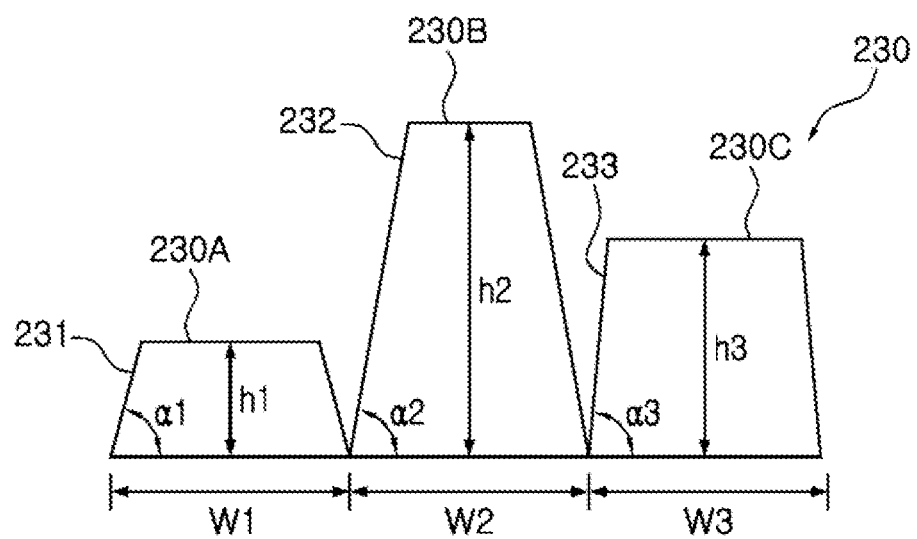
FIG. 2 is a cross-sectional view of a pattern group of the polarizing plate of FIG. 1.

Herein, a polarizing plate according to an embodiment of the present invention will be described with reference to FIG. 1 and FIG. 2. FIG. 1 is a cross-sectional view of a polarizing plate according to an embodiment of the present invention; and FIG. 2 is a cross-sectional view of a pattern group of the polarizing plate of FIG. 1.

Referring to FIG. 1, a polarizing plate 10 includes a polarizer 100, a pattern layer 200 formed on a light exit surface (upper surface) of the polarizer 100, and a protective film 300 formed on an upper surface of the pattern layer 200.

As manufactured by excluding the protective film 300 for the purpose of simplification of a manufacturing process and thickness reduction, a polarizing plate including the pattern layer 200 formed only on the upper surface of the polarizer 100 without the protective film 300 is also within the scope of the present invention.

In other embodiments, the protective film 300 may be interposed between the polarizer 100 and the pattern layer 200. That is, according to embodiments of the present invention, the location of the protective film in the polarizing plate is not particularly limited.

Pattern Layer

In an embodiment, the pattern layer 200 is formed between the polarizer 100 and the protective film 300 to allow polarized light received from the polarizer 100 to enter the protective film 300 therethrough.

The pattern layer 200 may include a first resin layer 210 and a second resin layer 220 disposed to face the first resin layer 210. In an embodiment, the pattern layer 200 may consist of the first resin layer 210 and the second resin layer 220, which directly contact each other.

The first resin layer 210 is formed on a light incident surface of the second resin layer 220. A pattern portion described herein may be formed at an interface between the first resin layer 210 and the second resin layer 220.

The pattern portion is composed of at least two pattern groups 230 repeatedly arranged. In the pattern portion, the pattern groups 230 may be the same as each other or may be different from each other.

Although FIG. 1 shows a polarizing plate in which no flat section is formed between the pattern groups 230, a flat section may be formed between the pattern groups 230. The structure will be described in further detail below.

In an embodiment, the pattern group 230 is composed of at least two engraved optical patterns consecutively arranged without a flat section therebetween, in which at least two of the engraved optical patterns have different aspect ratios and different base angles. With a structure wherein at least two of the engraved optical patterns have the same aspect ratio despite having different base angles, the polarizing plate may exhibit less improvement in viewing angle at all of lateral sides 30°, 45°, and 60°, or abnormally high or low brightness at a certain angle to provide uneven image quality at a lateral side. With a structure wherein at least two of the engraved optical patterns have the same base angle despite having different aspect ratios, the polarizing plate can suffer from the same problems.

In an embodiment, referring to FIG. 2, the pattern group 230 includes three optical patterns, that is, a first pattern 230A, a second pattern 230B, and a third pattern 230C, consecutively arranged without a flat section therebetween. At least two of the first pattern 230A, the second pattern 230B, and the third pattern 230C have different aspect ratios and different base angles.

Herein, as shown in FIG. 2, although any base angle may be defined as the base angle in a case in which both base angles of each of the first pattern 230A, the second pattern 230B, and the third pattern 230C are the same, a larger base angle among both base angles may be defined as the base angle in a case in which both base angles of each of the first pattern 230A, the second pattern 230B, and the third pattern 230C are different.

FIG. 1 and FIG. 2 show the polarizing plate wherein the engraved optical patterns are consecutively arranged in each pattern group without a flat section therebetween. In other embodiments, however, the pattern group may include a flat section between the engraved optical patterns, as described in further detail below.

In an embodiment, the first pattern, the second pattern, and the third pattern may have different base angles and different aspect ratios.

In another embodiment, the first pattern and the second pattern may have different base angles and different aspect ratios.

In another embodiment, the first pattern and the third pattern may have different base angles and different aspect ratios.

In another embodiment, the second pattern and the third pattern may have different base angles and different aspect ratios.

In an embodiment, the optical patterns are consecutively arranged in a sequence of increasing base angles in the pattern group. That is, referring to FIG. 2, a base angle ($\alpha 1$) of the first pattern 230A is less than a base angle ($\alpha 2$) of the second pattern 230B, which is less than a base angle ($\alpha 3$) of the third pattern 230C. In an embodiment, an aspect ratio of the first pattern 230A may be less than an aspect ratio of the second pattern 230B; an aspect ratio of the third pattern 230C may be less than or equal to the aspect ratio of the second pattern 230B; and the aspect ratio of the first pattern 230A may be less than or equal to the aspect ratio of the third pattern 230C.

Although FIG. 2 shows the pattern group 230 including three engraved optical patterns, the number of optical patterns in each of the pattern groups may be adjusted or selected depending upon the degree of collecting light emitted from a light-collecting backlight unit, brightness, thickness of the polarizing plate, and the like. For example, the number of engraved optical patterns in each pattern group may be about 2 to about 10, and, in an embodiment, from 2 to 5, and, in an embodiment, from 2 to 3.

In an embodiment, interfacial points between the first pattern 230A, the second pattern 230B, and the third pattern 230C provided as the engraved optical patterns in in the pattern group may contact each other and may be disposed coplanar to each other.

An aspect ratio of each of the first pattern 230A, the second pattern 230B, and the third pattern 230C, or an average aspect ratio of the patterns in the pattern group, may be about 0.3 to about 3.0, for example about 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, and, in an embodiment, about 1.0 to about 3.0, and, in an embodiment, about 1.0 to about 2.0. Within this range, the polarizing plate can have improved viewing angle and can exhibit uniform lateral brightness.

In an embodiment, a difference between a maximum aspect ratio and a minimum aspect ratio of the engraved optical patterns, that is, the first pattern, the second pattern, and the third pattern, in the pattern group may be about 0.5 or more, for example, about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, and, in an embodiment, about 0.5 to about 2.5, and, in an embodiment, about 0.5 to about 1.0. Within this range, the polarizing plate can achieve improvement in viewing angle and uniform lateral brightness.

In an embodiment, a base angle $\alpha 1$, $\alpha 2$, or $\alpha 3$ of each of the first pattern 230A, the second pattern 230B, and the third pattern 230C, or an average value of base angles of the patterns in the pattern group may be about 60° to about 90°, for example about 60°, about 65°, about 70°, about 75°, about 80°, about 85°, or about 90°, and, in an embodiment, about 60° to less than about 90°, and, in an embodiment, about 75° to about 85°. Within this range, the polarizing plate can achieve improvement in viewing angle and uniform lateral brightness.

In an embodiment, a difference between a maximum base angle and a minimum base angle of the optical patterns, that is, the first pattern, the second pattern, and the third pattern, in the pattern group may be about 5° or more, for example, about 5°, 6, 7°, 8, 9°, 10°, 11°, 12°, 13°, 14°, 15°, 16°, 17°, 18°, 19°, 20°, 21°, 22°, 23°, 24°, or 25°, and, in an embodiment, about 5° to about 25°, and, in an embodiment, about 5° to about 10°. Within this range, the polarizing plate can achieve improvement in viewing angle and uniform lateral brightness.

Both base angles of each of the first pattern, the second pattern, and the third pattern may be the same or different. In an embodiment, both base angles of each of the first pattern, the second pattern, and the third pattern are the same.

Maximum widths W1, W2, W3 of the first pattern 230A, the second pattern 230B, and the third pattern 230C, respectively, may be the same or different. For example, each of the maximum widths W1, W2, W3 may be about 1 μm to about 50 μm, for example, about 1 μm to about 20 μm. Within this range, the polarizing plate can achieve improvement in viewing angle and uniform lateral brightness, and can prevent or substantially prevent a pixel Moiré phenomenon with a liquid crystal panel.

Maximum heights h1, h2, h3 of the first pattern 230A, the second pattern 230B, and the third pattern 230C, respectively, may be the same or different. For example, each of the maximum heights h1, h2, h3 may be about 1 μm to about 50 μm, for example, about 1 μm to about 20 μm. Within this range, the polarizing plate can achieve improvement in viewing angle and uniform lateral brightness, and can prevent or substantially prevent a pixel Moiré phenomenon with a liquid crystal panel.

FIG. 2 shows the first pattern 230A, the second pattern 230B, and the third pattern 230C each having a trapezoidal cross-sectional shape in which slanted surfaces 231, 232, or 233 are connected to a flat surface at a top portion of each pattern. However, it is to be understood that the present invention is not limited thereto. Although the flat surface can be modified to have a surface roughness or a curved surface, in an embodiment, the flat surface does not have such a modification.

The engraved optical pattern may have a flat slanted surface or an angulated slanted surface, and may be a pattern having an N-sided polygonal (N being an integer from 4 to 10) cross-sectional shape including a triangular cross-sectional shape or a trapezoidal cross-sectional shape with a flat surface at a top portion thereof. This will be described in further detail below. In an embodiment, the optical patterns may have a trapezoidal cross-section.

In each of the pattern groups, the optical patterns may have the same shape or different shapes. In an embodiment, the optical patterns have the same shape, such that a process of manufacturing the polarizing plate is facilitated.

In FIG. 2, the flat surfaces of the first pattern 230A, the second pattern 230B, and the third pattern 230C may have the same width or different widths, and may have a width of greater than 0 μm and about 50 μm or less, for example, about 1 μm to about 20 μm, and, in an embodiment, about 1 μm to about 10 μm. Within this range, the polarizing plate can achieve improvement in viewing angle and uniform lateral brightness, and can prevent or substantially prevent a pixel Moiré phenomenon with a liquid crystal panel.

Referring again to FIG. 1, the pattern portion is composed of the pattern groups 230 repeatedly arranged therein. FIG. 1 shows the polarizing plate in which the first pattern, the second pattern, and the third pattern are arranged in the same sequence in each of the pattern groups. However, it is to be understood that the arrangement sequence of these optical patterns may be the same or different in adjacent pattern groups.

Although not shown in FIG. 1, each of the optical patterns in the pattern group may have a stripe shape extending in a longitudinal direction of the optical pattern. With this structure, the polarizing plate can achieve improvement in viewing angle at lateral sides. Herein, the "longitudinal direction of the optical pattern" means a different direction from the direction of the maximum width of the optical pattern, that is, a direction intersecting therewith.

In an embodiment, assuming that the polarizer has an absorption axis of 0°, an angle defined between the longitudinal direction of the optical pattern and the absorption angle of the polarizer 100 may be in a range from about −20° to about 20°, from about 70° to about 110°, or from about −70° to about −110°. Within this range, the polarizing plate can prevent or substantially prevent a pixel Moiré phenomenon with a liquid crystal panel. In an embodiment, the angle defined therebetween is in a range from about 90° or about −90°.

In an embodiment, the first resin layer 210 may be a high-refractivity pattern layer having a higher refractive index than the second resin layer 220.

In an embodiment, an absolute value of a difference in refractive index between the first resin layer 210 and the second resin layer 220 may be about 0.05 or more, and, in an embodiment, about 0.1 or more, and, in an embodiment, about 0.1 to about 0.3, about 0.1 to about 0.2, or about 0.15 to about 0.2. Within this range, the polarizing plate can achieve improvement in viewing angle.

In an embodiment, the first resin layer 210 may have a refractive index of about 1.50 to about 1.70, and, in an embodiment, about 1.55 to about 1.70, and, in an embodiment, about 1.60 to about 1.70. Within this range, the polarizing plate can have a high light spreading effect, can be easily manufactured, and can achieve improvement in spreading of polarized light and viewing angle.

The first resin layer 210 may include a filling portion filling at least part of the engraved optical patterns or a layer having the filling portion. In an embodiment, the filling portion completely fills the engraved optical patterns. In a structure in which the filling portion partially fills the engraved optical patterns, the remaining portion of the engraved optical patterns may be filled with air.

The first resin layer 210 may be formed of a composition for the first resin layer, which includes a curable resin. The curable resin may include at least one selected from among a UV-curable resin and a heat-curable resin, without being limited thereto. The composition for the first resin layer may further include at least one selected from among an initiator and an additive. The initiator may include at least one selected from among a photocurable initiator and a heat-curable initiator, without being limited thereto. The additive may include any typical additive known to those skilled in the art. For example, the additive may include at least one selected from among a leveling agent, a surface regulator, an antioxidant, an antifoaming agent, a UV absorbent, and a photo-stabilizer, without being limited thereto. The composition for the first resin layer may further include a typical solvent for coatability, for example, ethanol, propylene glycol monomethyletheracetate, methylethylketone, and methylisobutylketone, without being limited thereto.

In an embodiment, the first resin layer 210 may be a non-adhesive layer. When the first resin layer 210 is non-adhesive, the pattern layer may be stacked on an adherend, that is, on the polarizer, via an adhesive agent, a bonding agent, or an adhesive/bonding agent.

In another embodiment, the first resin layer 210 may be an adhesive layer. When the first resin layer 210 is an adhesive layer, the pattern layer may be stacked on the adherend without an additional adhesive agent, a bonding agent, or an adhesive/bonding agent, thereby enabling reduction in thickness of the polarizing plate.

An upper surface of the second resin layer 220 may be a plane adjoining the protective film 300 and a lower surface thereof may be formed with the engraved optical patterns corresponding to the pattern groups.

In an embodiment, the second resin layer 220 may be a low-refractivity pattern layer having a refractive index of about 1.3 to less than about 1.50, and, in an embodiment, about 1.3 to about 1.49. Within this range, the polarizing plate can achieve improvement in viewing angle.

The second resin layer 220 may be formed of a composition for the second resin layer, which includes a curable resin. The curable resin may include at least one selected from among a UV-curable resin and a heat-curable resin, without being limited thereto. The composition for the second resin layer may include at least one selected from among the initiator, the additive, and the solvent described above.

In an embodiment, the second resin layer 220 may have a maximum thickness of greater than 0 μm to about 50 μm or less, for example, greater than 0 μm to about 30 μm or less. Within this range, the polarizing plate can prevent or substantially prevent warpage, such as curling.

In an embodiment, a value obtained by subtracting the maximum height of the optical pattern from the maximum thickness of the second resin layer 220 (the maximum thickness of the second resin layer—the maximum height of the optical pattern) (also referred to as "net thickness") may be greater than 0 μm to about 30 μm or less, for example, greater than 0 μm to about 20 μm or less, or greater than 0 μm to about 10 μm or less. Within this range, the second resin layer can provide an effect of increasing surface hardness and can exhibit sufficient adhesion to the protective film.

Protective Film

The protective film 300 is formed on a light exit surface of the pattern layer 200 to allow light having passed through the pattern layer 200 to be emitted therethrough. The protective film 300 may support the pattern layer 200.

In an embodiment, the protective film 300 may be directly formed on the second resin layer 220 of the pattern layer 200, thereby enabling reduction in thickness of the polarizing plate 10. Herein, the expression "directly formed on" means that any adhesive layer, bonding layer, or adhesive/bonding layer is not interposed between the protective film 300 and the pattern layer 200.

In an embodiment, the protective film 300 may have a total light transmittance of 90% or more, for example, 90% to 100%, in the wavelength band of visible light. Within this range, the protective layer allows transmission of light therethrough without affecting light incident thereon.

The protective film 300 may include an optically transparent resin film, which includes a light incident surface and a light exit surface facing the light incident surface. The protective film may be composed of a single layer of a resin film or may be composed of multiple layers of a resin film. The resin may include at least one selected from among cellulose ester resins including triacetyl cellulose (TAC), cyclic polyolefin resins including amorphous cyclic olefin polymer (COP), polycarbonate resins, polyester resins including polyethylene terephthalate (PET), polyethersulfone resins, polysulfone resins, polyamide resins, polyimide resins, non-cyclic polyolefin resins, poly(meth)acrylic resins including poly(methyl methacrylate), polyvinyl alcohol resins, polyvinyl chloride resins, and polyvinylidene chloride resins, without being limited thereto.

The protective film may be a non-stretched film, a retardation film which is obtained by stretching the resin by a certain method to have a certain range of retardation, or an isotropic optical film. In an embodiment, the protective film may be an isotropic optical film having an Re of about 0 nm to about 60 nm, and, in an embodiment, about 40 nm to about 60 nm. Within this range of Re, the protective film can provide good image quality through compensation for viewing angle. Herein, the term "isotropic optical film" means a film having substantially the same nx, ny, and nz, (nz means a refractive index of the film in the thickness direction of the film) and the expression "substantially the same" includes not only a case in which nx, ny and nz are completely the same, but also a case in which there is an acceptable tolerance. In another embodiment, the protective film may be a retardation film having an Re of about 60 nm or less. For example, the protective film may have an Re of about 60 nm to about 500 nm, or about 60 nm to about 300 nm. In another embodiment, the protective film may have an Re of about 6,000 nm or more, about 8,000 nm or more, and, in an embodiment, about 10,000 nm or more, and, in an embodiment, greater than about 10,000 nm, and, in an embodiment, about 10,100 nm to about 30,000 nm, and, in an embodiment, about 10,100 nm to about 15,000 nm. Within this range, the protective film can prevent or substantially prevent generation of rainbow spots while further diffusing light diffused by a contrast improving layer.

In an embodiment, the protective layer 300 may have a thickness of about 5 μm to about 200 μm, for example, about 30 μm to about 120 μm. Within this thickness range, the protective layer 300 can be used in the polarizing plate.

Although not shown in FIG. 1, a surface treatment layer, such as any of a hard coating layer, a scattering layer, a low reflectivity layer, an ultra-low reflectivity layer, a primer layer, an anti-fingerprint layer, an antireflection layer, and an antiglare layer, may be further formed on at least one surface of the protective film 300 (at least one of an upper surface and a lower surface thereof). The surface treatment layer can provide further functions to the polarizing plate.

In an embodiment, with the pattern layer on the upper surface of the polarizer, the polarizing plate 10 may have a total light transmittance of about 40% or more, and, in an embodiment, about 40% to about 50%, and a degree of polarization of about 95% or more, and, in an embodiment, about 95% to about 100%. Within this range, the polarizing plate can be suitably used in a liquid crystal display.

Polarizer

The polarizer 100 may polarize light received from a liquid crystal panel and allow the polarized light to travel to the pattern layer 200 after passing therethrough. The polarizer 100 is formed on a light incident surface of the pattern layer 200.

In an embodiment, the polarizer 100 may include a polyvinyl alcohol polarizer obtained by uniaxially stretching a polyvinyl alcohol film, or a polyene-based polarizer obtained by dehydrating a polyvinyl alcohol film. In an embodiment, the polarizer 100 may have a thickness of about 5 μm to about 40 μm. Within this range, the polarizer 100 can be used for an optical display.

The polarizing plate may include the polarizer 100 and a protective film formed on at least one surface of the polarizer. The protective film protects the polarizer, thereby improving reliability and mechanical strength of the polarizing plate. The protective film may include a film comprising any of the resins mentioned above in description of the protective film 300.

Although not shown in FIG. 1, an adhesive layer may be further formed on a lower surface of the polarizer 100 to attach the polarizing plate to a liquid crystal panel.

In an embodiment, the polarizing plate is configured to satisfy the following Relations 1 and 2 in application to a light-collecting backlight unit, thereby securing brightness uniformity while improving viewing angle at a lateral side.

$$W_{30°} > W_{45°} > W_{60°} \quad \text{Relation 1}$$

$$W_{60°} > 0.2 \quad \text{Relation 2}$$

where $W_{30°}$ is a ratio of brightness ($L_{30°}$) at a lateral side (30° or −30°) to brightness ($L_{0°}$) at a front side (0°) in a white mode;

$W_{45°}$ is a ratio of brightness ($L_{45°}$) at a lateral side (45° or −45°) to brightness ($L_{0°}$) at the front side (0°) in a white mode; and $W_{60°}$ is a ratio of brightness ($L_{60°}$) at a lateral side (60° or −60°) to brightness ($L_{0°}$) at the front side (0°) in a white mode.

Figure 3:
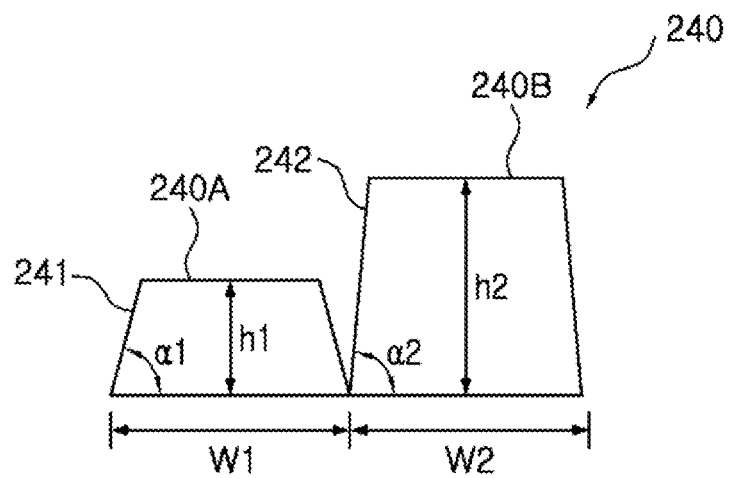
FIG. 3 is a cross-sectional view of a pattern group of a polarizing plate according to another embodiment of the present invention.

Next, a polarizing plate according to another embodiment of the present invention will be described with reference to FIG. 3. FIG. 3 is a cross-sectional view of a pattern group of a polarizing plate according to another embodiment of the present invention.

Referring to FIG. 3, the polarizing plate according to this embodiment is substantially the same as the polarizing plate of FIG. 1 except that a pattern portion includes pattern groups 240 repeatedly arranged therein instead of the pattern groups 230.

The pattern group 240 is composed of a total of two engraved optical patterns comprising a first pattern 240A and a second pattern 240B, which are consecutively arranged without a flat section therebetween. The first pattern 240A and the second pattern 240B have different base angles and different aspect ratios.

Referring to FIG. 3, each of the first pattern 240A and the second pattern 240B has a trapezoidal shape in which slanted surfaces 241, 242 are connected to each other by a flat surface at a top portion thereof. However, it is to be understood that the present invention is not limited thereto. For example, the engraved optical patterns according to this embodiment may have an N-sided polygonal cross-sectional shape, as described above.

The shape, the base angle α1, the maximum width W1, the maximum height h1, and the material of the first pattern 240A may be changed or selected as described with reference to FIG. 1 and FIG. 2, and the shape, the base angle α2, the maximum width W2, the maximum height h2, and the material of the second pattern 240B may be changed or selected as described with reference to FIG. 1 and FIG. 2.

Figure 4:
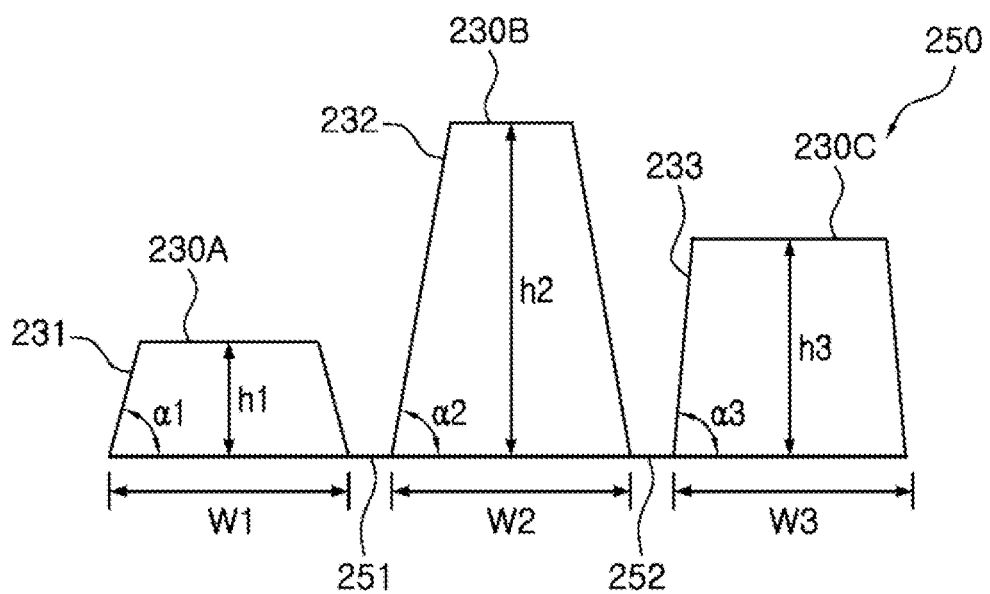
FIG. 4 is a cross-sectional view of a pattern group of a polarizing plate according to another embodiment of the present invention.

Next, a polarizing plate according to another embodiment of the present invention will be described with reference to FIG. 4. FIG. 4 is a cross-sectional view of a pattern group of a polarizing plate according to another embodiment of the present invention.

Referring to FIG. 4, the polarizing plate according to this embodiment is substantially the same as the polarizing plate of FIG. 1 except that a pattern portion includes pattern groups 250 repeatedly arranged therein instead of the pattern groups 230.

The pattern group 250 further includes flat sections 251, 252 between engraved optical patterns 230A, 230B, 230C. The flat sections 251, 252 serve to improve transmittance by suppressing deterioration in front brightness.

In an embodiment, the flat sections 251, 252 may be arranged at a cyclic pitch (that is, a sum of the maximum width of one flat section and the maximum width of an engraved optical pattern immediately adjacent to the flat section) of about 1 μm to about 100 μm, and, in an embodiment, about 3 μm to about 50 μm, in the pattern group. Within this range, the polarizing plate can prevent or substantially prevent a pixel Moiré phenomenon with a liquid crystal panel.

In the pattern group, a ratio of a total sum of the maximum widths of the flat sections to a total sum (W1+W2+W3) of the maximum widths of the engraved optical patterns may be about 0 to about 2, for example 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2.0, and, in an embodiment, greater than about 0 to about 2, about 0 to about 1, or greater than about 0 to about 1. Within this range, the polarizing plate can achieve improvement in lateral viewing angle.

In an embodiment, the flat sections 251, 252 may have a maximum width of about 1 μm to about 20 μm, and, in an embodiment, about 1 μm to about 10 μm. Within this range, the optical patterns can be easily formed while securing suitable transmittance and improvement in viewing angle.

Although FIG. 4 shows the polarizing plate in which the flat sections 251, 252 are formed between the engraved optical pattern 230A and the engraved optical pattern 230B and between the engraved optical pattern 230B and the engraved optical pattern 230C, the flat section may be formed in at least one of these regions.

Figure 5:
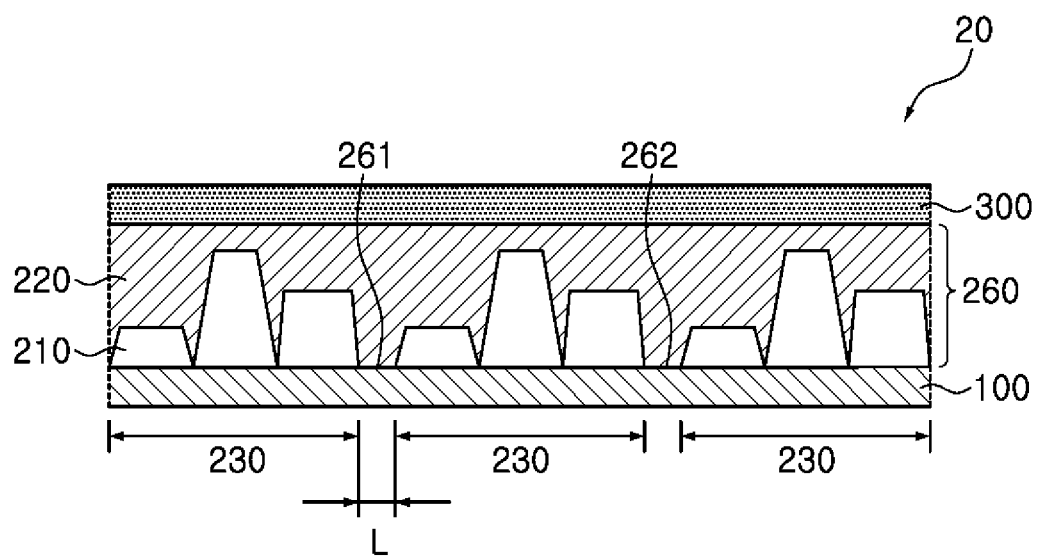
FIG. 5 is a cross-sectional view of a polarizing plate according to another embodiment of the present invention.

Next, a polarizing plate according to another embodiment of the invention will be described with reference to FIG. 5. FIG. 5 is a cross-sectional view of a polarizing plate according to another embodiment of the present invention.

Referring to FIG. 5, the polarizing plate 20 according to this embodiment is substantially the same as the polarizing plate 10 described above except for a pattern layer 260 instead of the pattern layer 200.

In the pattern layer 260, each of flat sections 261, 262 are formed between adjacent pattern groups 230. The flat sections 261, 262 can facilitate pattern formability and can secure suitable transmittance.

In the pattern group 230, a ratio of a width L of the flat sections 261, 262 to the total sum (W1+W2+W3) of the maximum widths of the engraved optical patterns or the total width of the pattern groups 230 may be about 0 to about 1, for example 0, 0.1, 0.2, 0.3, 0.4, 0.5, 0.6, 0.7, 0.8, 0.9, or 1, and, in an embodiment, greater than about 0 to about 1. Within this range, the flat sections 261, 262 can facilitate pattern formability and can secure suitable transmittance.

In an embodiment, each of the flat sections 261, 262 may have a maximum width (L) of greater than 0 μm to about 200 μm or less, and, in an embodiment, greater than 0 μm to about 100 μm or less. Within this range, the flat sections 261, 262 can facilitate pattern formability and can secure suitable transmittance.

Next, a polarizing plate according to another embodiment of the invention will be described with reference to FIG. 6.

Figure 6:
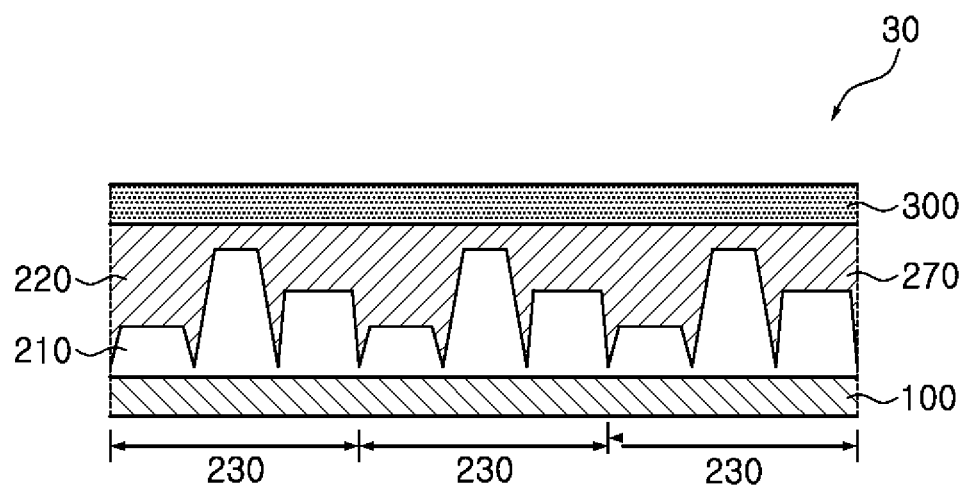
FIG. 6 is a cross-sectional view of a polarizing plate according to another embodiment of the present invention.

FIG. 6 is a cross-sectional view of a polarizing plate according to embodiment of the present invention.

Referring to FIG. 6, the polarizing plate 30 according to this embodiment is substantially the same as the polarizing plate 10 described above except for a pattern layer 270 instead of the pattern layer 200.

The pattern layer 270 is substantially the same as the pattern layer of the polarizing plate 10 described above except that a first resin layer 210 of the pattern layer 270 includes a filling portion completely filling the engraved optical patterns so as to extend farther than the engraved optical patterns in the thickness direction. Accordingly, a maximum thickness of the first resin layer may be greater than a maximum thickness of the engraved optical patterns in the pattern group.

Figure 7:
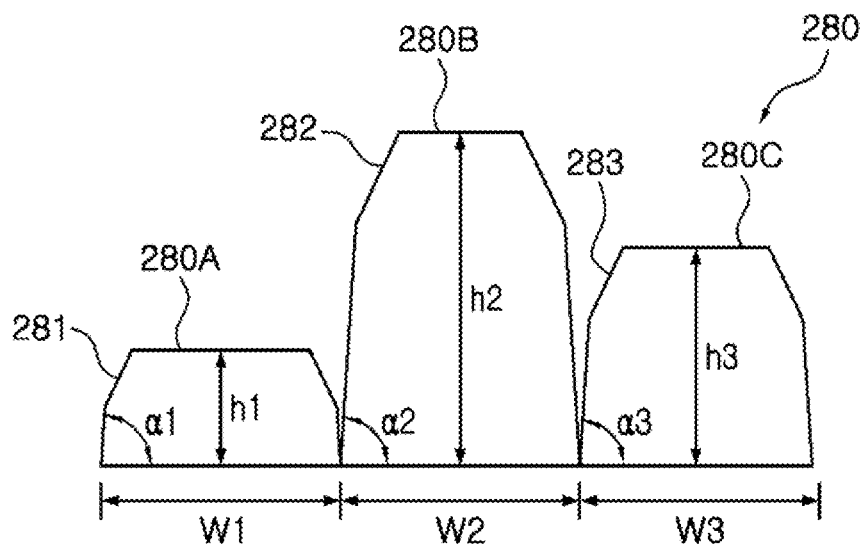
FIG. 7 is a cross-sectional view of a pattern group of a polarizing plate according to yet another embodiment of the present invention.

Next, a polarizing plate according to another embodiment of the invention will be described with reference to FIG. 7. FIG. 7 is a cross-sectional view of a pattern group of a polarizing plate according to another embodiment of the present invention.

Referring to FIG. 7, a pattern group 280 is composed of at least three optical patterns, that is, a first pattern 280A, a second pattern 280B, and a third pattern 280C, which are consecutively arranged without a flat section therebetween. At least two of the first pattern 280A, the second pattern 280B, and the third pattern 280C have different base angles α1, α2, α3 and different aspect ratios h1/W1, h2/W2, h3/W3.

Each of the first pattern 280A, the second pattern 280B, and the third pattern 280C has a slanted surface 281, 282, 283 connected to both a top portion thereof and the maximum width thereof and composed of two planes angulated to each other. Although FIG. 7 shows an engraved pattern having a hexagonal cross-section, it is to be understood that the present invention is not limited thereto.

Although not shown in FIG. 7, the polarizing plate shown in FIG. 7 may also further include such a flat section between the pattern groups or inside the pattern group.

Next, a polarizing plate according to another embodiment will be described.

The polarizing plate according to this embodiment is substantially the same as the polarizing plate according to the above embodiment except that the first resin layer according to this embodiment is a low-refractivity pattern layer having a lower refractive index than the second resin layer. For description of the refractive index, refer to the above description of the embodiment of FIG. 1.

A liquid crystal display according to the present invention includes a polarizing plate according to an embodiment of the present invention.

In an embodiment, the liquid crystal display according to the present invention may include the polarizing plate as a viewer-side polarizing plate disposed at a viewer side with respect to a liquid crystal panel. The "viewer-side polarizing plate" is a polarizing plate disposed at a screen side, that is, at a side opposite to a light source, with respect to the liquid crystal panel.

In an embodiment, the liquid crystal display incudes a light-collecting backlight unit, a light source-side polarizing plate, a liquid crystal panel, and a viewer-side polarizing plate sequentially stacked in the stated order, in which the viewer-side polarizing plate may include the polarizing plate according to an embodiment of the present invention. The "light source-side polarizing plate" is a polarizing plate disposed at a light source side.

The light-collecting backlight unit may be composed of a light source, a light guide plate, and a light-collecting sheet.

Figure 9:
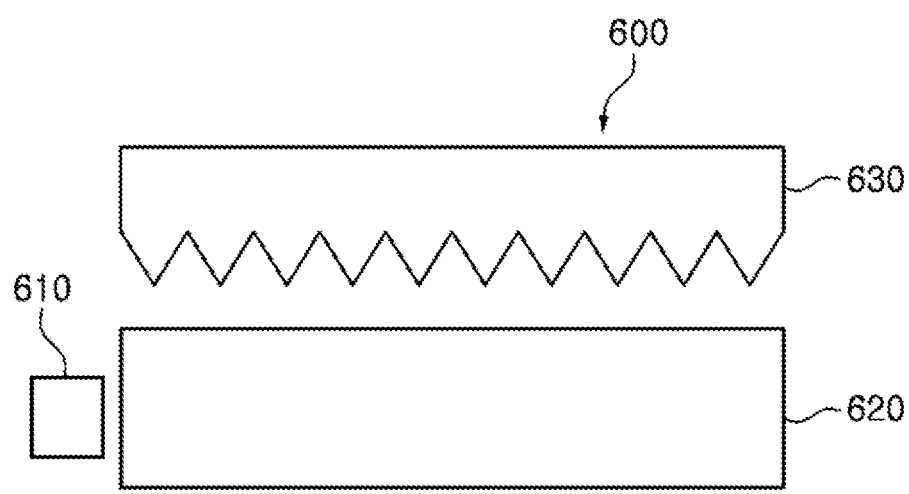
FIG. 9 is a cross-sectional view of a light-collecting backlight unit according to an embodiment of the present invention.

In an embodiment, referring to FIG. 9, a light-collecting backlight unit 600 may be composed of a light source 610, a light guide plate 620, and a light-collecting sheet 630.

The light source 610 and the light guide plate 620 may be a light source and a light guide plate, which are typically used in a liquid crystal display. The light-collecting sheet 630 may include a base film and an inverted prism formed on a light incident surface of the base film. The inverted prism can improve efficacy of light through total reflection of light emitted from the light guide plate by the pattern shape. In an embodiment, the light-collecting sheet may be integrally attached to the light source-side polarizing plate of the liquid crystal display.

Although not shown in FIG. 9, a reflective sheet may be further formed on a lower surface of the light guide plate 620 to achieve further improvement in luminous efficacy.

The liquid crystal panel may employ a vertical alignment (VA) mode, an IPS mode, a patterned vertical alignment (PVA) mode, or a super-patterned vertical alignment (S-PVA) mode, without being limited thereto.

Next, the present invention will be described in further detail with reference to some examples. However, it should be noted that these examples are provided for illustration only and are not to be construed in any way as limiting the present invention.

Example 1

A first resin layer (high-refractivity layer) was formed of a composition comprising a UV-curable resin (SHIN-A T&C Co., Ltd.) having a refractive index of 1.62. A second resin layer (low-refractivity layer) was formed of a composition comprising a UV-curable resin (SHIN-A T&C Co., Ltd.) having a refractive index of 1.47.

A coating layer was formed by depositing a composition for a second resin layer to a predetermined thickness on one surface (light incident surface) of a polyethylene terephthalate (PET) film (TA044, thickness: 80 μm, Toyobo Co., Ltd.) as a protective film. The second resin layer was formed on the coating layer by applying an optical pattern thereto using a film having an optical pattern formed thereon, followed by UV curing at 500 mJ/cm². Then, a first resin layer was formed on one surface of the second resin layer by coating a composition for the first resin layer, followed by UV curing at 500 mJ/cm². Next, a polarizer having a PET/PVA/COP triple layer structure was coupled to one surface of the first resin layer, thereby preparing a polarizing plate.

The following Table 1 shows one pattern group of a pattern portion formed at an interface between the first resin layer and the second resin layer. In the pattern portion, the pattern groups are repeatedly arranged without a flat section, as shown in FIG. 1.

Referring to Table 1, the pattern group was composed of a total of three patterns, that is, a first pattern, a second pattern, and a third pattern, which are sequentially arranged in the stated order without a flat section therebetween. Each of the first pattern, the second pattern, and the third pattern is an engraved optical pattern having a trapezoidal cross-section. Each of the first pattern, the second pattern, and the third pattern has a base angle and an aspect ratio, as shown in Table 1. Both base angles of each of the first pattern, the second pattern, and the third pattern are the same.

Examples 2 and 3

Polarizing plates were manufactured in the same manner as in Example 1 except that the pattern group was composed of three patterns, that is, a first pattern, a second pattern, and a third pattern sequentially arranged in the stated order without a flat section, and each of the first pattern, the second pattern, and the third pattern was an engraved trapezoidal pattern and had a base angle and an aspect ratio, as shown in Table 1.

Example 4

A polarizing plate was manufactured in the same manner as in Example 1 except that the pattern group was composed of two patterns, that is, a first pattern and a second pattern, sequentially arranged in the stated order without a flat section, and each of the first pattern and the second pattern was an engraved trapezoidal pattern and had a base angle and an aspect ratio, as shown in Table 1.

Example 5

A polarizing plate was manufactured in the same manner as in Example 1 except that a flat section was formed between the engraved optical patterns in each pattern group. The flat section had a width of 5 μm.

Example 6

A polarizing plate was manufactured in the same manner as in Example 1 except that a flat section was formed between the pattern groups. The flat section had a width of 5 μm.

Example 7

A polarizing plate was manufactured in the same manner as in Example 1 except that a flat section was formed between the engraved optical patterns in each pattern group (flat section having a width of 5 μm), a flat section was formed between the pattern groups (flat section having a width of 5 μm), and the refractive indices of the first resin layer and the second resin layer were changed as listed in Table 1.

Example 8

A polarizing plate was manufactured in the same manner as in Example 1 except that the refractive indices of the first resin layer and the second resin layer were changed as listed in Table 1.

Comparative Examples 1 and 2

Polarizing plates were manufactured in the same manner as in Example 1 except that the pattern group was composed of three patterns, that is, a first pattern, a second pattern, and a third pattern, sequentially arranged in the stated order without a flat section, and each of the first pattern, the second pattern, and the third pattern was an engraved trapezoidal pattern and had a base angle and an aspect ratio, as shown in Table 1.

In Comparative Example 1, the first pattern, the second pattern, and the third pattern had an aspect ratio of 1.0 and different base angles. In Comparative Example 2, the first pattern, the second pattern, and the third pattern had a base angle of 80° and different aspect ratios.

Comparative Example 3

A polarizing plate was manufactured in the same manner as in Example 1 except that a trapezoidal pattern having an aspect ratio of 1.0 and a base angle of 85° was formed at an interface between the first resin layer and the second resin layer without a flat section.

Comparative Example 4

A first resin layer (low-refractivity layer) was formed of a composition comprising a UV-curable resin (SHIN-A T&C Co., Ltd.) having a refractive index of 1.47. A second resin layer (high-refractivity layer) was formed of a composition comprising a UV-curable resin (SHIN-A T&C Co., Ltd.) having a refractive index of 1.62.

Figure 10:
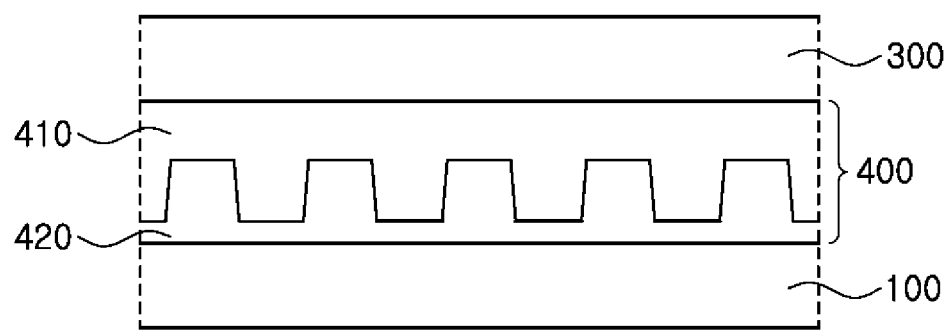
FIG. 10 is a cross-sectional view of a polarizing plate of Comparative Example 4.

A polarizing plate was manufactured in the same manner as in Example 1 except that trapezoidal patterns each having an aspect ratio of 1.0 and a base angle of 85° and flat sections were alternately formed at an interface between the first resin layer and the second resin layer. The trapezoidal patterns had the same aspect ratio and the same base angle. FIG. 10 is a cross-sectional view of the polarizing plate of Comparative Example 4. Referring to FIG. 10, the polarizing plate includes a polarizer 100; a pattern layer 400 including a first resin layer 420 and a second resin layer 410; and a protective film 300, which are sequentially stacked in the stated order, wherein trapezoidal patterns and flat sections are alternately formed at an interface between the first resin layer 420 and the second resin layer 410.

Models for measurement of viewing angle for the polarizing plates of the Examples and Comparative Examples were manufactured and viewing angle characteristics were measured at lateral angles shown in Table 1.

Light Source-Side Polarizing Plate

A polarizer was manufactured by stretching a polyvinyl alcohol film to three times an initial length thereof at 60° C., followed by dyeing with iodine and stretching the dyed film to 2.5 times in a boric acid solution at 40° C. Then, a polarizing plate was manufactured by bonding triacetylcellulose films (thickness: 80 μm) to both surfaces of the polarizer via a bonding agent for polarizing plates (Z-200, Nippon Goshei Co., Ltd.). The manufactured polarizing plate was used as a light source-side polarizing plate.

Viewer-Side Polarizing Plate

As a viewer-side polarizing plate, each of the polarizing plates manufactured in the Examples and Comparative Examples was used.

Module for Liquid Crystal Display

The light source-side polarizing plate was attached to a lower surface of a liquid crystal panel and the viewer-side polarizing plate was attached to an upper surface thereof. Here, the viewer-side polarizing plate was disposed such that the protective film of the viewer-side polarizing plate was placed at the outermost periphery from the upper surface of the liquid crystal panel. Then, a module for liquid crystal displays was manufactured by placing a light-collecting backlight unit including an inverse prism optical sheet at a lower side of the light source-side polarizing plate. In a white mode, a brightness profile as indicated by a dash-dotted line of FIG. 8 can be obtained by calculating and graphing the ratio of brightness at a lateral side to brightness at a front side (0°) with respect to light emitted from the light-collecting backlight unit. Referring to FIG. 8, the percentage ratio ($W_{30°}$) of brightness ($L_{30°}$) at a lateral side (30°) to brightness ($L_{0°}$) at a front side (0°) was 11% and the percentage ratio ($W_{60°}$) of brightness ($L_{60°}$) at a lateral side (60°) to brightness ($L_{0°}$) at a front side (0°) was 0%.

Brightness values from the front side (0°) to a right lateral side (90°) and a left lateral side (−90°) were measured in a white mode using an EZCONTRAST X88RC (EZXL-176R-F422A4, ELDIM Co., Ltd.).

The ratio of brightness at a lateral side to brightness in a front side (0°) in a white mode was calculated and results are shown in FIG. 11 to FIG. 22.

In a white mode, the percentage ratio of brightness at a lateral side (30°) to brightness at a front side (0°), the percentage ratio of brightness at a lateral side (45°) to brightness at a front side (0°), and the percentage ratio of brightness at a lateral side (60°) to brightness at a front side (0°) were calculated and shown in Table 1.

TABLE 1

| | | Example | | | | | | | | Comparative Example | | | |
|---|---|---|---|---|---|---|---|---|---|---|---|---|---|
| | | 1 | 2 | 3 | 4 | 5 | 6 | 7 | 8 | 1 | 2 | 3 | 4 |
| First pattern | Base angle | 75 | 75 | 75 | 75 | 75 | 75 | 75 | 75 | 75 | 80 | 85 | 85 |
| | Aspect ratio | 1.0 | 1.0 | 1.0 | 1.0 | 1.0 | 1.0 | 1.0 | 1.0 | 1.0 | 1.0 | 1.0 | 1.0 |
| Second pattern | Base angle | 80 | 80 | 80 | 80 | 80 | 80 | 80 | 80 | 80 | 80 | — | — |
| | Aspect ratio | 2.0 | 2.0 | 2.0 | 2.0 | 2.0 | 2.0 | 2.0 | 2.0 | 1.0 | 1.5 | — | — |
| Third pattern | Base angle | 85 | 85 | 85 | — | 85 | 85 | 85 | 85 | 85 | 80 | — | — |
| | Aspect ratio | 1.0 | 1.5 | 2.0 | — | 1.0 | 1.0 | 1.0 | 1.0 | 1.0 | 2.0 | — | — |
| Refractive index | Second resin layer | 1.47 | 1.47 | 1.47 | 1.47 | 1.47 | 1.47 | 1.47 | 1.65 | 1.47 | 1.47 | 1.47 | 1.62 |
| | First resin layer | 1.62 | 1.62 | 1.62 | 1.62 | 1.62 | 1.62 | 1.62 | 1.45 | 1.62 | 1.62 | 1.62 | 1.47 |
| Flat section in pattern group | | Absent | Absent | Absent | Absent | Present | Absent | Present | Present | Absent | Absent | Absent | Present |
| Flat section between pattern group | | Absent | Absent | Absent | Absent | Absent | Present | Present | Present | Absent | Absent | Absent | Present |
| Viewing angle | W30° | 58 | 61 | 67 | 48 | 34 | 30 | 32 | 40 | 22 | 73 | 26 | 23 |
| | W45° | 44 | 46 | 48 | 41 | 43 | 41 | 29 | 44 | 26 | 70 | 9 | 6 |

TABLE 1-continued

Figure 11:
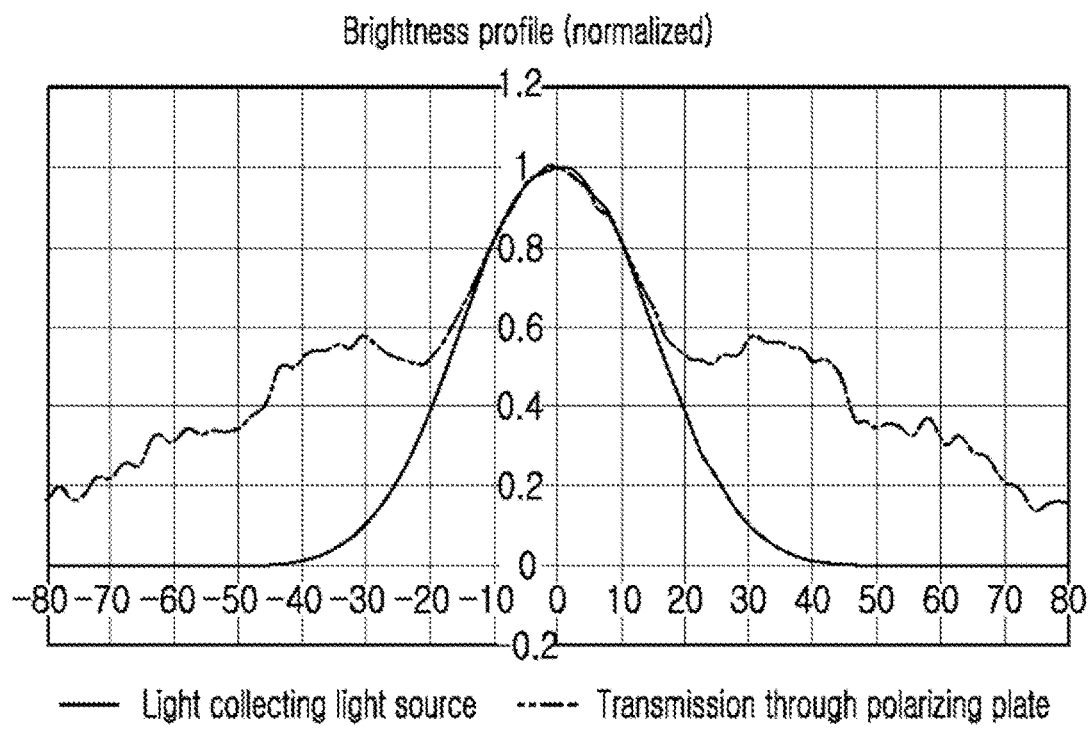
FIG. 11 to FIG. 18 show a brightness profile (solid line) of a light-collecting backlight unit and brightness profiles (dash-dotted line) in application of polarizing plates of Examples to the light-collecting backlight unit.
Figure 12:
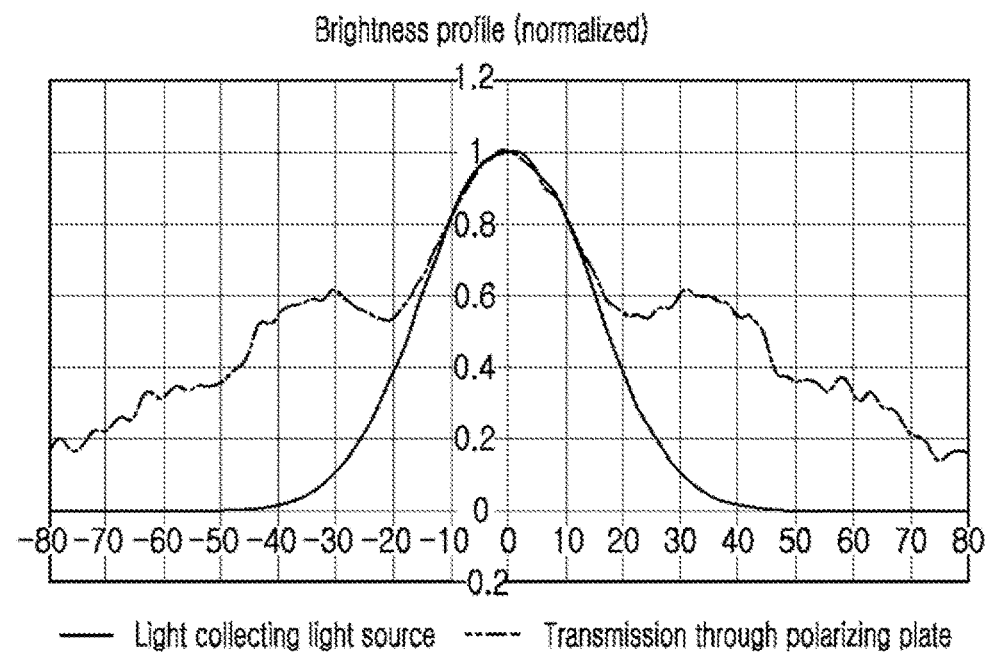
Figure 13:
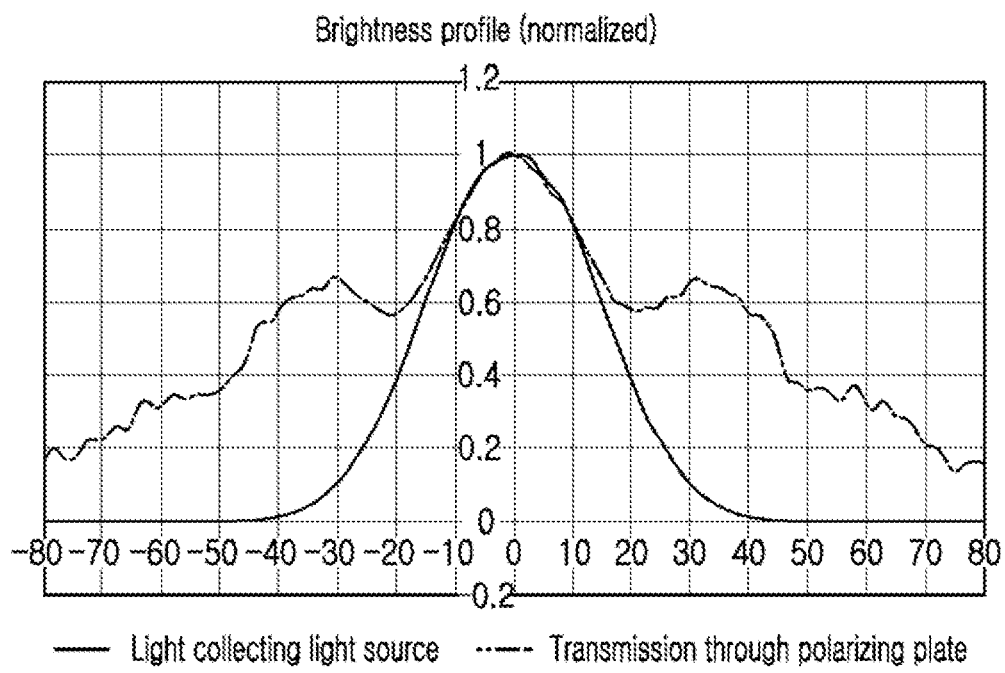
Figure 14:
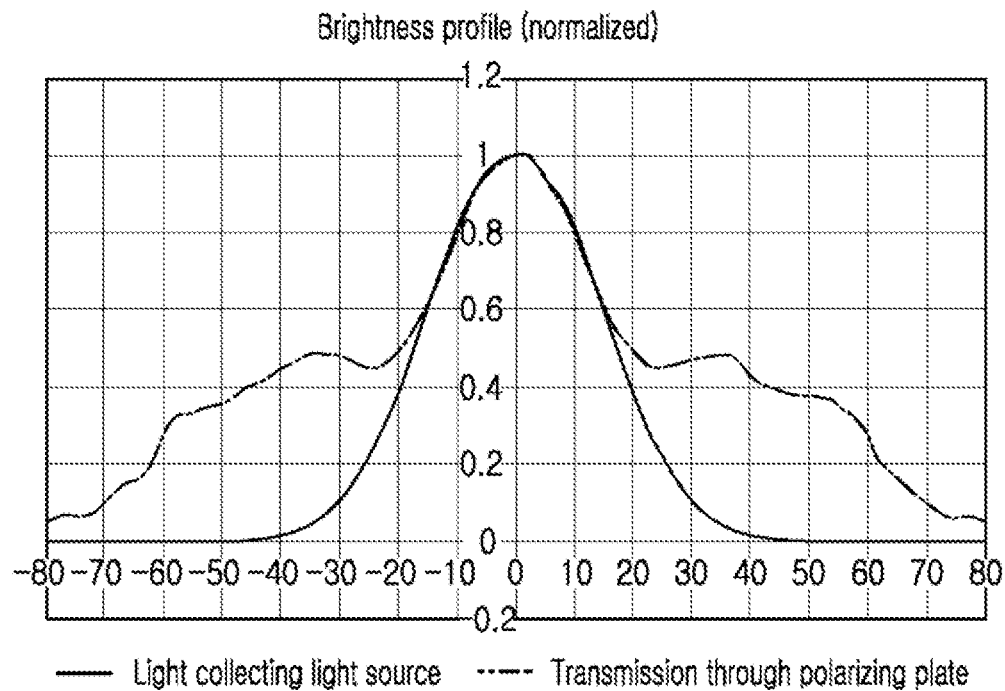
Figure 15:
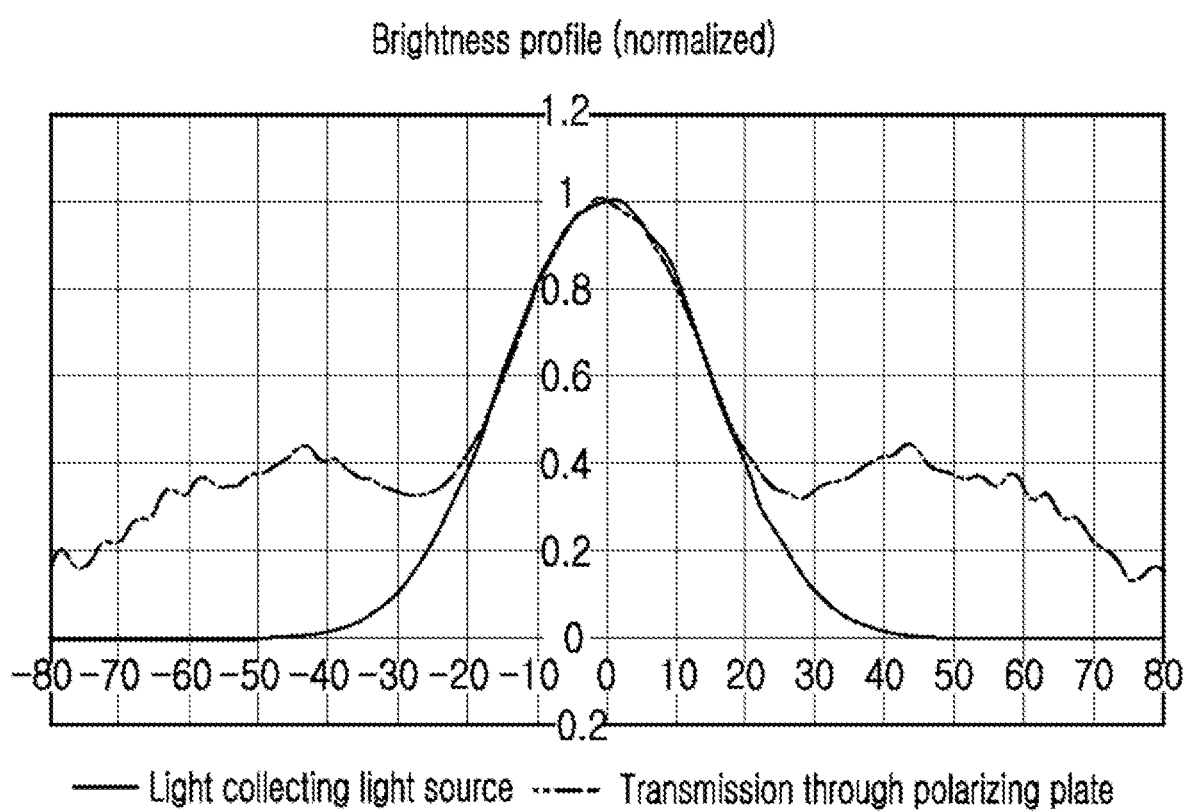
Figure 16:
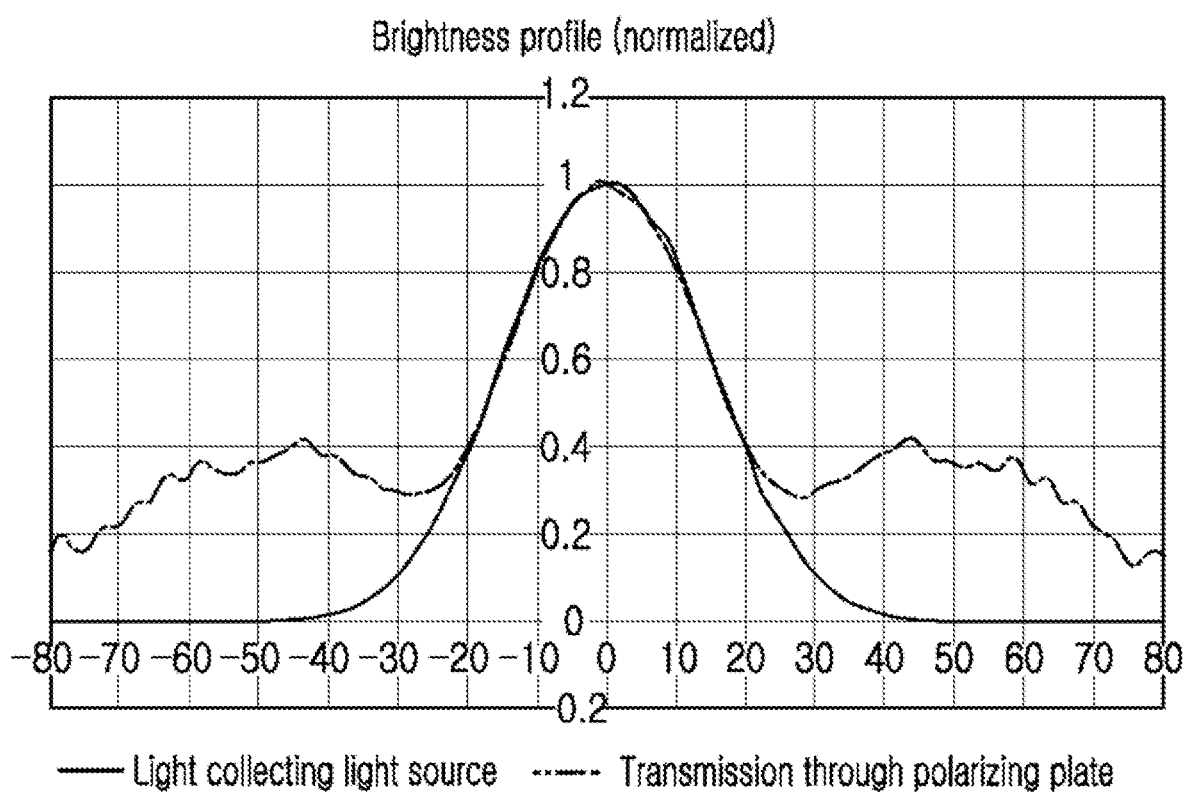
Figure 17:
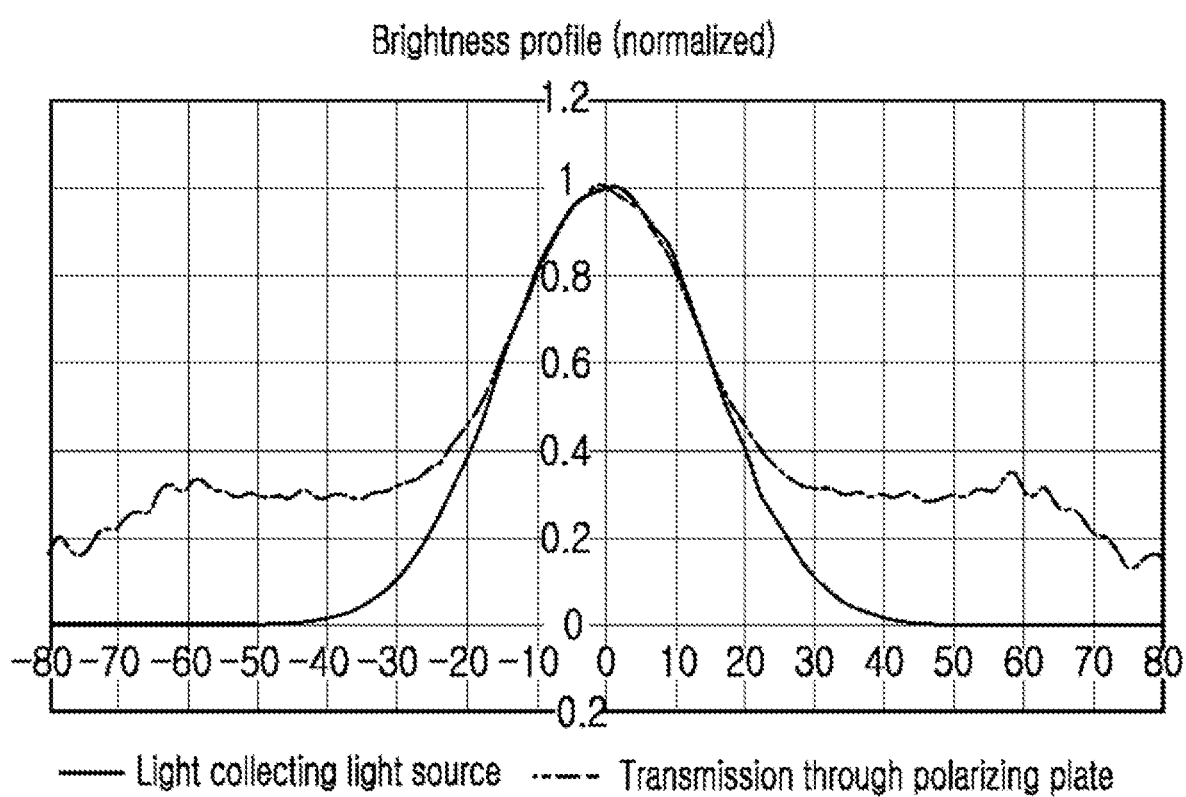
Figure 18:
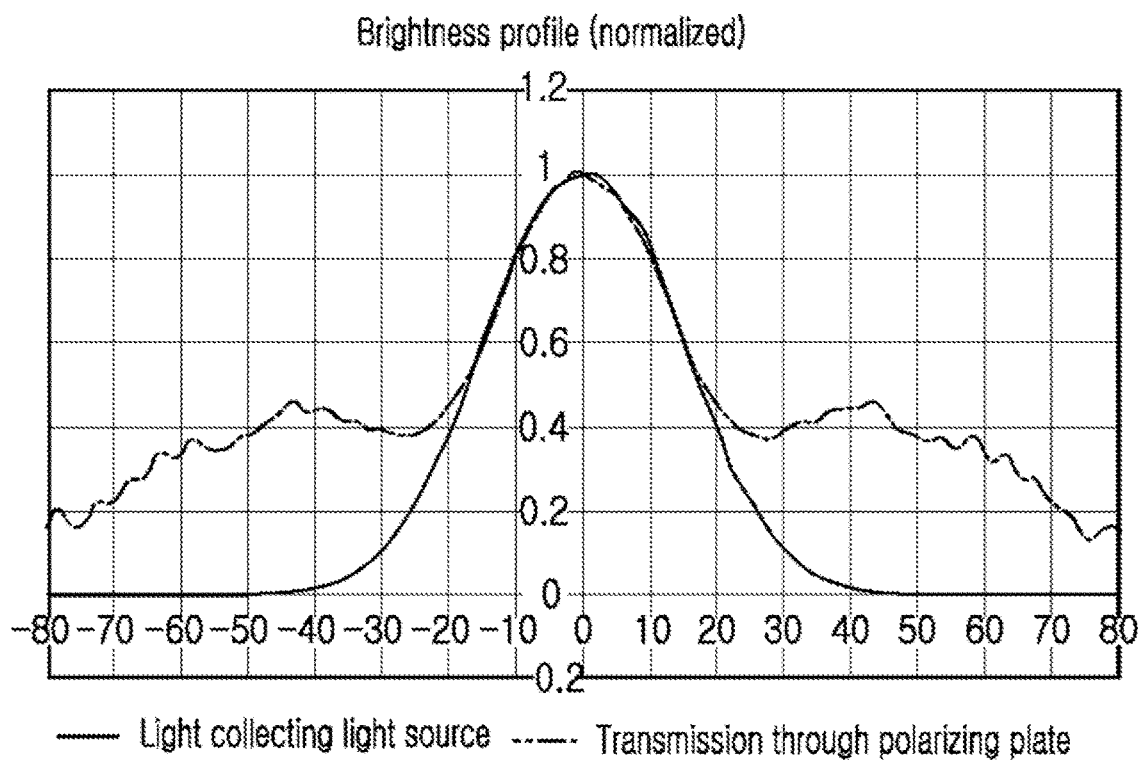
Figure 19:
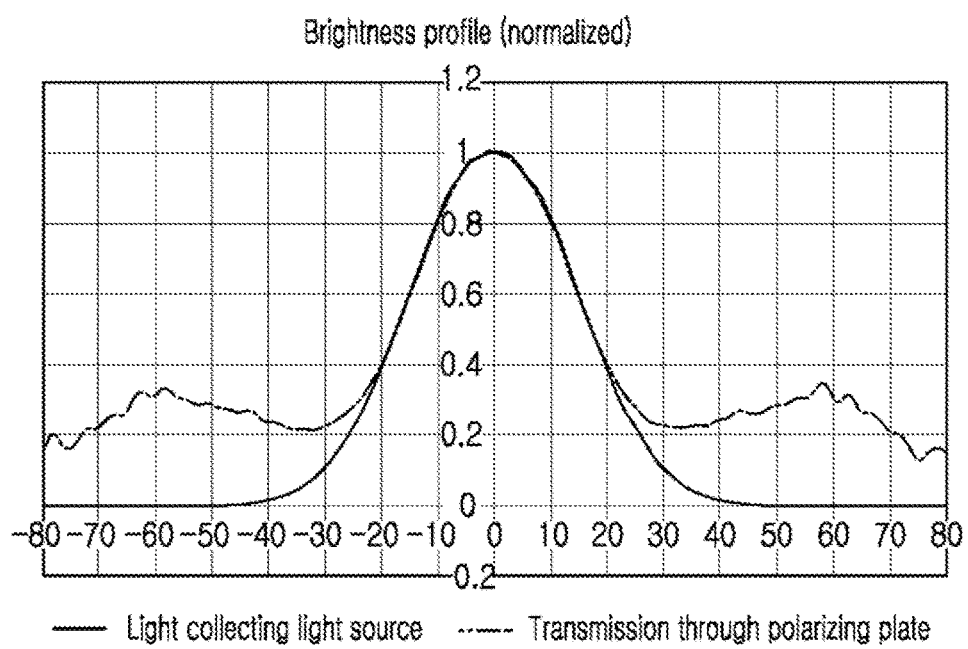
FIG. 19 to FIG. 22 show a brightness profile (solid line) of a light-collecting backlight unit and brightness profiles (dash-dotted line) in application of polarizing plates of Comparative Examples to the light-collecting backlight unit.
Figure 20:
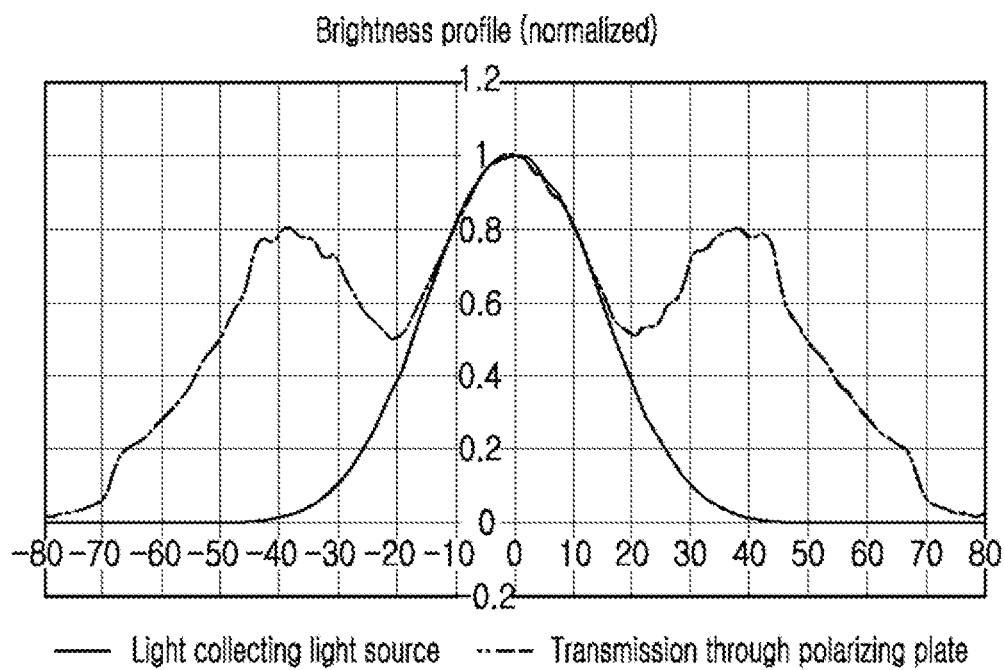
Figure 21:
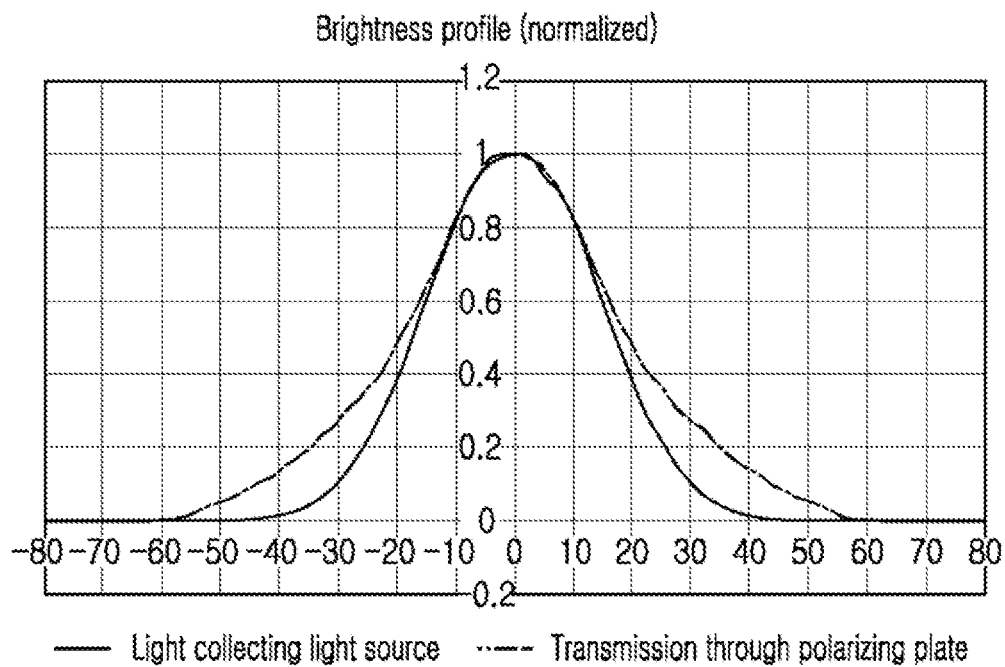
Figure 22:
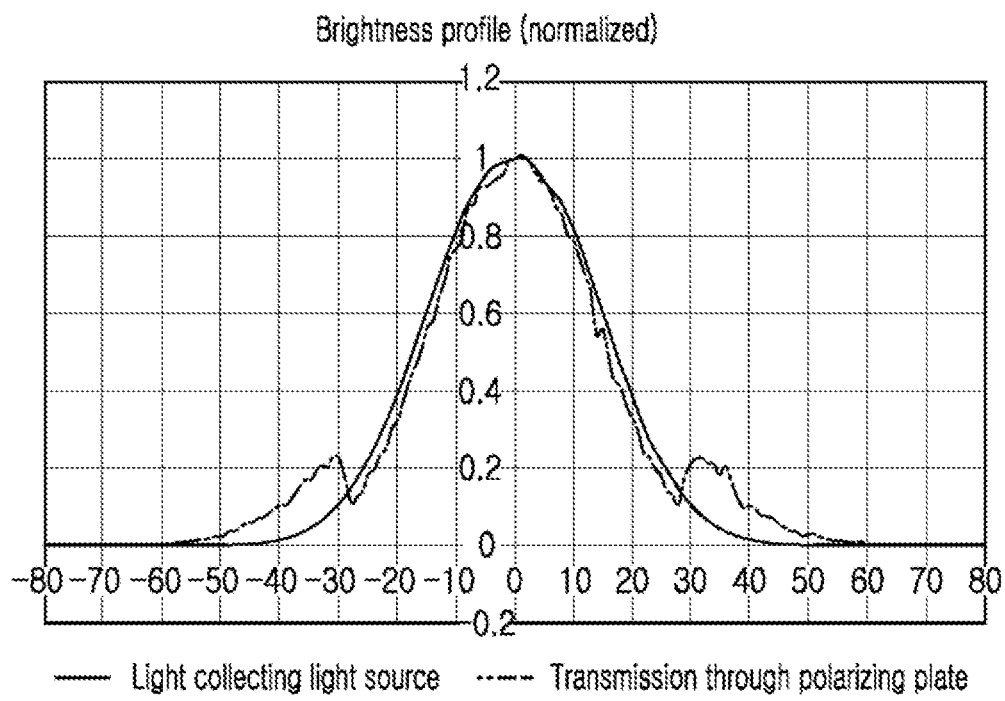

|  | Example | | | | | | | | Comparative Example | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| W60° | 31 | 31 | 31 | 25 | 31 | 31 | 31 | 32 | 31 | 27 | 0 | 0 |
| Result | FIG. 11 | FIG. 12 | FIG. 13 | FIG. 14 | FIG. 15 | FIG. 16 | FIG. 17 | FIG. 18 | FIG. 19 | FIG. 20 | FIG. 21 | FIG. 22 |

*In Table 1, the base angle is represented in degrees (°) and the viewing angle is represented in percentage (%).

As shown in Table 1 and FIG. 11 to FIG. 18, the polarizing plate according to the present invention achieved improvement in viewing angle at all of lateral sides (30°, 45°, 60°), and had low deviation in viewing angle characteristics at the lateral sides (30°, 45°, 60°) in application to a liquid crystal display including a light-collecting backlight unit.

By contrast, the polarizing plate of Comparative Example 1, in which at least two patterns of the pattern group had different base angles and the same aspect ratio, failed to improve viewing angle characteristics at all of lateral sides (30°, 45°, 60°), as shown in Table 1 and FIG. 19. In addition, the polarizing plate of Comparative Example 2, in which at least two patterns of the pattern group had different aspect ratios and the same base angle, failed to improve viewing angle characteristics at a lateral side (60°) and exhibited larger deviation in viewing angle characteristics at a lateral side (60°) than at a lateral side (30°) and at a lateral side (45°), as shown in Table 1 and FIG. 20.

Further, the polarizing plate of Comparative Example 3, in which each pattern of the pattern group had the same aspect ratio and the same base angle, failed to improve viewing angle characteristics at all of lateral sides (30°, 45°, 60°) and exhibited no brightness, particularly at a lateral side (60°), as shown in Table 1 and FIG. 21. Further, the polarizing plate of Comparative Example 4, in which each pattern of the pattern group had the same aspect ratio and the same base angle and had a flat section therebetween, failed to improve viewing angle characteristics at all of the lateral sides (30°, 45°, 60°) and exhibited no brightness, particularly at a lateral side (60°), as shown in Table 1 and FIG. 22.

(1) A module for liquid crystal displays was manufactured using the polarizing plate of Example 4 in the same manner as in measurement of viewing angle in Table 1. Brightness at a front side (0°) of the spherical coordinate system was measured in a white mode and a black mode using an EZCONTRAST X88RC (EZXL-176R-F422A4, ELDIM Co., Ltd.). A ratio (A1) of brightness in the white mode to brightness in the black mode was calculated.

With respect to a module for liquid crystal displays manufactured in the same manner except that light source-side polarizing plates were attached to both sides of a liquid crystal panel, a ratio (A2) of brightness in the white mode to brightness in the black mode was calculated in the same manner.

The percentage ratio (contrast ratio) of A1 to A2 was calculated and shown in Table 2.

As obtained by measuring brightness values at a lateral side (30°) and at a lateral side (60°) instead of measuring brightness at a front side (0°), the percentage ratio (contrast ratio) of A1 to A2 was calculated and shown in Table 2.

(2) A module for liquid crystal displays was manufactured using the polarizing plate of Example 4 in the same manner as in Table 1 except that a typical backlight unit including a normal prism optical sheet was provided to a lower side of the light source-side polarizing plate. In a white mode, a brightness profile as indicated by a solid line of FIG. 8 could be obtained by calculating and graphing the ratio of brightness at a lateral side to brightness at a front side (0°) with respect to light emitted from the typical backlight unit. Referring to FIG. 8, the percentage ratio ($W_{30°}$) of brightness at a lateral side (30°) to brightness at a front side (0°) was about 52% and the percentage ratio ($W_{60°}$) of brightness at a lateral side (60°) to brightness at a front side (0°) was about 13%.

$W_{30°}$, $W_{45°}$, and $W_{60°}$ were calculated in the same manner and shown in the following Table 2 and FIG. 23.

The percentage ratios of A1 to A2 at a front side (0°), at a lateral side (30°), and at a lateral side (60°) were calculated in the same manner as in (1) and are shown in the following Table 2.

Table 3 shows percentage values of $W_{30°}$ and $W_{60°}$ for a light-collecting backlight unit and a typical backlight unit.

TABLE 2

|  | Viewing angle characteristics (%) | | | Contrast ratio (%) | | |
| --- | --- | --- | --- | --- | --- | --- |
|  | W30° | W45° | W60° | Front side (0°) | Lateral side (30°) | Lateral side (60°) |
| In application to light-collecting backlight unit | 48 | 41 | 25 | 98 | 120 | 450 |
| In application to typical backlight unit | 61 | 52 | 41 | 36 | 108 | 407 |

TABLE 3

|  | Brightness profile | |
| --- | --- | --- |
|  | W30° | W60° |
| Light-collecting backlight unit | 11 | 0 |
| Typical backlight unit | 52 | 13 |

As shown in Table 3, it can be seen that the light-collecting backlight unit and the typical backlight unit exhibit completely different brightness profiles at a lateral side 30° and at a lateral side 60°.

As shown in Table 2, it could be seen that, in application of the polarizing plate according to the present invention to a liquid crystal display including a light-collecting backlight unit, the liquid crystal display had improved viewing angle characteristics at all of lateral sides (30°, 45°, 60°) while improving front contrast and lateral contrast.

Figure 23:
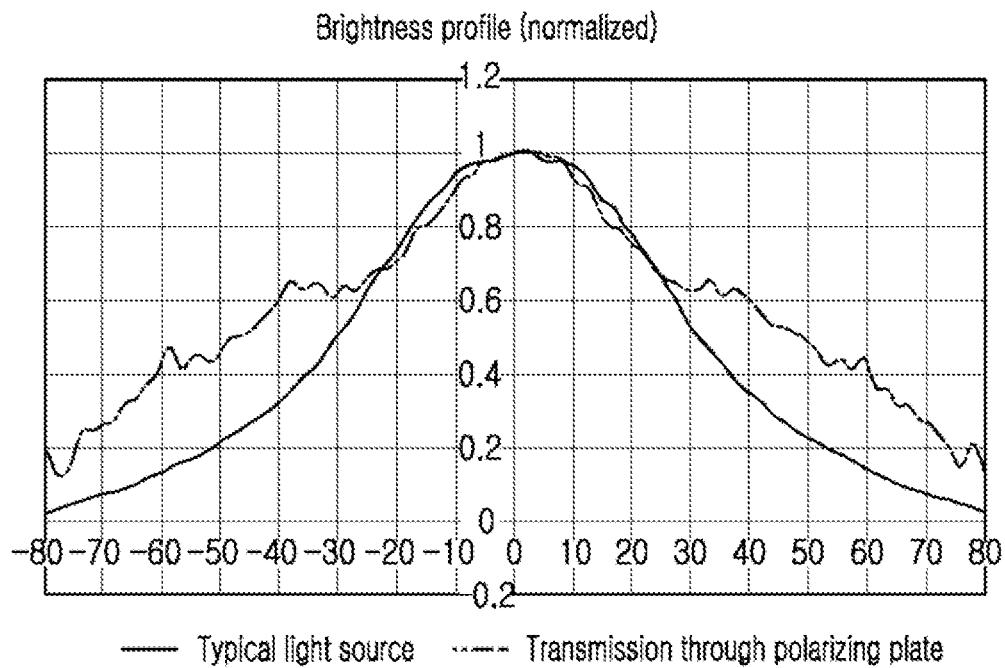
FIG. 23 shows a ratio (solid line) of brightness at a lateral side to brightness at a front side with respect to light emitted from a typical backlight unit and a brightness profile (dash-dotted line) in application of a polarizing plate of Example 4 to a typical backlight unit.

By contrast, as shown in Table 2 and FIG. 23, in application of the polarizing plate according to the present invention to a liquid crystal display including a typical backlight unit, the liquid crystal display suffered from significant reduction in front contrast and exhibited less improvement in lateral contrast than the liquid crystal display employing the light-collecting backlight unit. This result shows that the polarizing plate according to the present invention effectively operates in application to the liquid crystal display including the light-collecting backlight unit.

Accordingly, embodiments of the present invention provide a polarizing plate capable of improving brightness, viewing angle, and contrast ratio at a front side and a lateral side in application to a liquid crystal display including a light-collecting backlight unit.

Further, embodiments of the present invention provide a polarizing plate capable of improving front contrast ratio, lateral contrast ratio, and external appearance in application to a liquid crystal display including a light-collecting backlight unit.

Further, embodiments of the present invention provide a polarizing plate capable of reducing deviation in a ratio of brightness at a lateral side to brightness at a front side depending upon an angle of the lateral side in application to a liquid crystal display including a light-collecting backlight unit.

Further, embodiments of the present invention provide a liquid crystal display that includes a light-collecting backlight unit, can improve brightness, viewing angle and contrast ratio at a front side and a lateral side, and can reduce deviation in ratio of brightness at a lateral side to brightness at a front side depending upon an angle of the lateral side.

It is to be understood that, although some example embodiments have been described herein, various modifications, changes, alterations, and equivalent embodiments can be made by those skilled in the art without departing from the spirit and scope of the present invention.

What is claimed is:

1. A polarizing plate comprising:
   a polarizer; and
   a pattern layer on a light exit surface of the polarizer,
   wherein the pattern layer comprises a first resin layer and a second resin layer sequentially arranged on the polarizer,
   a pattern portion is located at an interface between the first resin layer and the second resin layer and is composed of at least two pattern groups repeatedly arranged therein, each of the pattern groups comprising at least two engraved optical patterns, at least two adjacent pattern groups of the pattern groups having a same configuration,
   at least two of the engraved optical patterns in each of the pattern groups have different aspect ratios and different base angles, and
   the engraved optical patterns in the pattern groups are consecutively arranged without a flat section therebetween.

2. The polarizing plate according to claim 1, wherein the engraved optical patterns have an aspect ratio of about 0.3 to about 3.0.

3. The polarizing plate according to claim 1, wherein the engraved optical patterns in the pattern groups have a difference of about 0.5 or more between a maximum aspect ratio and a minimum aspect ratio.

4. The polarizing plate according to claim 1, wherein the engraved optical patterns have a base angle of about 60° to about 90°.

5. The polarizing plate according to claim 1, wherein the engraved optical patterns in the pattern groups have a difference of about 5° or more between a maximum base angle and a minimum base angle.

6. The polarizing plate according to claim 1, wherein the engraved optical patterns have a flat surface at a top portion thereof and an N-sided polygonal cross-sectional shape, N being an integer from 4 to 10.

7. The polarizing plate according to claim 1, wherein a flat section is absent or further formed between two immediately adjacent pattern groups.

8. The polarizing plate according to claim 1, wherein the engraved optical patterns extend in a stripe shape in a longitudinal direction thereof.

9. The polarizing plate according to claim 1, wherein an angle defined between a longitudinal direction of the engraved optical pattern and an absorption axis of the polarizer is from about −20° to about 20°, from about 70° to about 110°, or from about −70° to about −110°, where the absorption axis of the polarizer is defined as 0°.

10. The polarizing plate according to claim 1, wherein an absolute value of a difference in refractive index between the first resin layer and the second resin layer is about 0.05 or more.

11. The polarizing plate according to claim 1, wherein a number of the engraved optical patterns in each of the pattern groups is from 2 to 10.

12. The polarizing plate according to claim 1, wherein each of the pattern groups is composed of a total of two optical patterns comprising a first pattern and a second pattern as the engraved optical patterns, and the first pattern and the second pattern have different base angles and different aspect ratios.

13. The polarizing plate according to claim 1, wherein each of the pattern groups is composed of a total of three optical patterns comprising a first pattern, a second pattern, and a third pattern, as the engraved optical patterns, and at least two of the first pattern, the second pattern, and the third pattern have different base angles and different aspect ratios.

14. The polarizing plate according to claim 1, wherein the first resin layer is a filling portion filling at least part of the engraved optical patterns or a layer comprising the filling portion.

15. The polarizing plate according to claim 1, further comprising a protective film stacked on at least one of a light exit surface and a light incident surface of the pattern layer.

16. The polarizing plate according to claim 15, further comprising at least one surface treatment layer selected from among a hard coating layer, a scattering layer, a low reflectivity layer, an ultra-low reflectivity layer, a primer layer, an anti-fingerprint layer, an antireflection layer, and an antiglare layer on at least one surface of the protective film.

17. A liquid crystal display comprising the polarizing plate according to claim 1.

18. The liquid crystal display according to claim 17, comprising a backlight unit, a light source-side polarizing plate, a liquid crystal panel, and the polarizing plate sequentially stacked in the stated order, the backlight unit comprising a light-collecting backlight unit comprising an inverted prism sheet.

19. A polarizing plate comprising:
   a polarizer; and
   a pattern layer on a light exit surface of the polarizer,
   wherein the pattern layer comprises a first resin layer and a second resin layer sequentially arranged on the polarizer,
   a pattern portion is located at an interface between the first resin layer and the second resin layer and is composed of at least two pattern groups repeatedly arranged therein, each of the pattern groups comprising at least two engraved optical patterns, at least two adjacent pattern groups of the pattern groups having a same configuration, at least two of the engraved optical patterns in each of the pattern groups have different aspect ratios and different base angles, and the at least two adjacent pattern groups are consecutively arranged without a flat section therebetween.

\* \* \* \* \*